United States Patent [19]
McBrayer, Jr. et al.

[11] Patent Number: 5,720,889
[45] Date of Patent: Feb. 24, 1998

[54] METHOD FOR TREATING WASTE WATER STREAMS BY OXIDATION IN HIGH TEMPERATURE REACTOR

[75] Inventors: Roy Nelson McBrayer, Jr.; James Murray Eller, both of Austin; Jimmy Glen Swan, Alvin; James Edward Deaton, Georgetown; Robert Ray Gloyna; Jerry Franklin Blagg, both of Austin, all of Tex.

[73] Assignee: RPC Waste Management Services, Inc., Austin, Tex.

[21] Appl. No.: 659,339

[22] Filed: Jun. 6, 1996

Related U.S. Application Data

[60] Division of Ser. No. 221,051, Apr. 1, 1994, Pat. No. 5,582,715, which is a continuation-in-part of Ser. No. 868,954, Apr. 16, 1992, abandoned.

[51] Int. Cl.⁶ ............................. B01D 17/12; C02F 1/72
[52] U.S. Cl. ................ 210/739; 210/759; 210/761; 422/62; 422/110; 422/193; 422/194
[58] Field of Search ........................ 210/96.1, 175, 210/177, 199, 205, 739, 752, 761, 774, 805, 806, 758, 759, 762; 110/346; 422/189, 193, 194, 62, 108, 110, 235, 111; 436/62, 134, 146; 261/128, 147, 151, 78.1

[56] References Cited

U.S. PATENT DOCUMENTS

| | | | |
|---|---|---|---|
| 2,824,058 | 2/1958 | Zimmermann et al. | 210/761 |
| 3,852,192 | 12/1974 | Fassell et al. | 210/761 |
| 3,920,548 | 11/1975 | Fassell et al. | 210/761 |
| 4,869,833 | 9/1989 | Binning et al. | 210/761 |
| 4,963,329 | 10/1990 | Burgess et al. | 422/194 |
| 5,252,224 | 10/1993 | Modell et al. | 210/761 |
| 5,421,998 | 6/1995 | Li et al. | 210/205 |

Primary Examiner—Joseph W. Drodge
Attorney, Agent, or Firm—Conley, Rose & Tayon, P.C.

[57] ABSTRACT

A method for treating waste water streams by introducing a mixture of pre-heated waste water and an amount of oxidant lower than that required to oxidize all the organic matter in the waste stream into the front port of an elongate tubular reaction chamber. The amount of oxidant is preferably high enough, however, to raise the temperature of the stream in the reaction chamber to 750°–1,200° F. A first injection side port is preferably located downstream from the front port of the reaction chamber at a distance at which the temperature has reached a maximum value, and 90–100% of the available oxidant has been consumed. Oxidant and water may be simultaneously injected through the first port, in a manner that the amount of oxidant is adequate to oxidize a specified amount of organic matter, and the amount of water is effective to counterbalance the heat produced by the reaction of the co-injected oxidant with the respective organic matter. At the point that 90–100% of the newly injected oxidant has been consumed, a second port is used to introduce more oxidant and water in a similar manner and under similar conditions. More ports are also used, following similar rules, until the organic matter has been substantially exhausted. The reaction chamber preferably has a multiplicity of ports, so that depending upon the particular stream, its BTU value, and other parameters, the appropriately spaced ports are selected as injection ports. Highly improved output is achieved by the process and apparatus of the present invention.

66 Claims, 12 Drawing Sheets

METHOD FOR TREATING WASTE WATER STREAMS BY OXIDATION IN HIGH TEMPERATURE REACTOR

This is a divisional of application Ser. No. 08/221,051 filed Apr. 1, 1994, now U.S. Pat. No. 5,582,715, which is a Continuation-in-part of application Ser. No. 07/868,954, filed on Apr. 16, 1992, now abandoned, which is incorporated herein by reference.

FIELD OF THE INVENTION

This invention relates to methods and apparatuses for treating waste water streams at a range of temperatures and pressures in the vicinity of supercritical water conditions. More particularly, the present invention pertains to methods and apparatuses for closely controlling the reaction conditions in a manner to considerably increase the output of reactor assemblies and reactors or reaction chambers for treating waste water streams as compared to the presently utilized devices which operate in the vicinity of supercritical water conditions.

BACKGROUND OF THE INVENTION

A number of different ways for disposing of waste have been extensively used. Landfilling and incineration are the major ones. However, these methods do not seem to offer the best solution for many wastes.

Landfilling is becoming less and less desirable since it does not offer elimination of waste, but just underground storage. Thus, it has started to be used more for by-products of other types of waste management, such as incineration for example, than for landfilling the primary waste.

Incineration, requiring oxidation of waste at high temperatures with high volumes of air, followed by separation of the effluent gases from the produced ash and the entrained particulate matter, becomes involved, complicated, and expensive, despite the fact that at first glance it sounds to be a simple process of "just burning the waste".

In recent years, a new method, based on supercritical water oxidation, has been developed. The new method achieves substantially complete oxidation of waste by using higher reaction temperatures in conjunction with certain phase properties of water. This method results in fairly compact equipment and is an excellent candidate for on-site disposal. Supercritical water oxidation also has the advantage of producing a clean water product suitable for process recycle, thereby facilitating waste minimization. However, as with the development of any new process or equipment, there are numerous problems which have not been resolved so far, and which are vital for a finally successful use and commercial exploitation.

In a water liquid/vapor phase diagram, one may see that there is a critical point of temperature (about 705° F.) and a critical point of pressure (about 3,200 psia) over which there is only one single fluid phase, and which, although it represents neither liquid nor vapor, behaves and seems to have more of a gas character than of a liquid one at pressures near the critical point. At substantially higher pressures, a more liquid-like behavior is observed with an accompanying increase in solubility inorganic matter. The single-phase condition occurring above the critical points is called supercritical condition.

It is worth noting that organic matter decomposes readily under supercritical conditions, and in the presence of oxidant, carbonaceous compounds oxidize substantially completely to carbon dioxide, sulfur compounds to sulfates and nitrogen compounds decompose mostly to molecular nitrogen. It is worth noting that under supercritical water oxidation conditions, only small amounts of nitrogen oxides may be produced, in contrast with incineration which favors the production of nitrogen oxides. Inorganic salts are substantially insoluble in the supercritical water single phase for pressures of the order of 4,000 psia, while it has been reported that they are at least partially soluble at considerably higher pressures, such as 10,000 psia, for example.

The use of very high pressures at elevated temperatures presents a serious problem in the construction of reactors or reaction chambers which can withstand these adverse conditions. It is well known that as the temperature increases, the strength of materials decreases drastically. Supercritical pressures (greater than about 3,200 psia) at temperatures exceeding about 1,000° F. present an enormous challenge to any construction material, let alone higher pressures (of the order of 10,000 psia) and temperatures, which may be desirable for a number of reasons, including dissolution of inorganic salts in the supercritical single phase. If in addition to the temperature/pressure challenge, one considers the harsh environment inside the reaction chamber, the problem becomes very serious.

Thus, it is extremely important to improve the waste removal efficiency of such reaction chambers as much as possible.

In general, control of reaction temperature is essential in maintaining control of many reaction processes and, therefore, the end results produced by such processes. In some instances, exothermic reactions proceed so rapidly that, unless controlled, they generate temperatures which endanger the integrity of the reaction vessel itself. Many reactions produce reaction by-products which, if the temperature is not properly controlled, may proceed to further undesired secondary reactions. In reactions which occur under pressure and temperature conditions sufficient to achieve supercritical water conditions, salt precipitation and/or other competing side reactions may occur, as aforementioned, unless the heat of reaction is closely controlled. On the other hand, if the temperatures are allowed to fall under certain limits, the reaction products are incomplete, new phases may be formed in the reaction zone, or the reaction may cease to take place altogether.

Reaction temperatures of exothermic reactions are generally controlled by limiting the rate of reaction For example, over-all reaction rate can be limited by gradual mixing of reactants so that the one reactant and/or the reaction vessel absorbs energy from the reaction and transfers that energy to an external sink by cooling the reaction vessel or the like. Such processes, however, are difficult to control and cannot be readily or economically applied to many reaction conditions.

A number of patents have dealt with supercritical water oxidation of coal, organic substances, and waste, among which are U.S. Pat. Nos. 4,292,953 (Dickinson), 4,141,829 (Thiel et al.), 4,338,199 (Modell), 4,543,190 (Modell), 4,564,458 (Burleson), 4,594,164 (Titmas), 4,792,408 (Titmas), 4,822,394 (Zeigler et al.), 4,822,497 (Hong et al.), 4,861,497 (Welch et al.), 4,891,139 (Zeigler et al.), 5,075,017 (Hossain et al.), 4,113,446 (Modell et al.), 4,338,199 Reexamined (Modell), 5,106,513 (Hong), 4,983,296 (McMahon et al.), 5,011,614 (Gresser et al), 5,053,142 (Sorensen et al.), 5,057,231 (Mueller et al.), 5,106,513 (Hong), 5,133,877 (Rofer et al.), 5,183,577 (Lehmann), 5,192,453 (Keckler et al.), 5,221,486 (Fassbender), 5,232, 604 (Swallow et al.), 5,232,605 (Baur et al.), 5,240,619 (Copa et al.), 5,250,193 (Sawicki et al.), and 5,252,224 (Modell et al.).

None of these references has resolved or even has attempted to resolve the vital aforementioned problems, in contrast with the present invention, which uses critically spaced side ports to inject critical amounts of oxidant and water, in addition to other criticalities, in order to alleviate such problems by considerably improving the output of reaction chambers operating in the vicinity of supercritical water conditions, as set forth in detail hereinbelow.

U.S. Pat. No. 1,988,456 (Lysholm) discloses a gas turbine system, wherein fuel is introduced, through a number of nozzles, into a stream of air. Water may be sprayed in the gas turbine in order to reduce production of soot and to maintain the temperature under a permissible maximum. In addition, no criticality is disclosed or implied regarding the spacing between nozzles.

Enhancement of the reaction rates and therefore reaction efficiency by reactant concentration and temperature control is not disclosed, suggested or implied.

U.S. Pat. No. 3,549,314 (Shah) discloses a method of oxidizing black liquor in a sinuous or duct oxidizer, by dispersing an oxidant containing gas into the continuous black liquor phase flowing within the duct. The gas is passed into the black liquor at spaced intervals, and the resulting dispersion in oxidized black liquor is discharged into a vessel lo below the level of the body of liquor in the vessel. The ports through which the gas enters the oxidizer are preferably, as evidenced by Shah's FIG. 1, are equidistantly spaced, and it appears that substantially the same amount of oxidant-containing gas passes through each and all ports. The multiplicity of ports apparently serves the purpose of producing as many gas bubbles as possible in order to maximize the degree of oxidation of the black liquor. No criticality is disclosed or implied regarding the distance between ports, or the amount of oxidant entering through each particular port. Further, no temperature control is needed or used.

U.S. Pat. No. 3,654,070 (Pradt et al.) discloses a method of oxidizing organic material in spent liquor. The spent liquor from the pulping of cellulosic material by oxidation in an aqueous medium is subjected to oxidation with an oxidant-containing gas at a temperature between 200° and 375° C. This process oxidizes the organic waste products to carbon dioxide and regenerates the aqueous alkaline medium for reuse in the pulping process U.S. Pat. Nos. 4,898,107, 4,714,032, 4,593,202, 4,380,960, and 4,377,066 (all to Dickinson) disclose recirculation of water to a reaction chamber or air injection in one or more side ports, however, indiscriminately spaced.

U.S. Pat. No. 4,721,575 (Binning et al.) discloses a method for effecting accelerated chemical reactions at elevated temperatures and pressures including wet oxidation of materials in waste streams. Multiple injection and extraction points are provided along the path of the tubular reactor coil used to permit gas, liquid or solid reactants to be added or extracted as desired.

None of the above references disclose, suggest, or imply the criticalities of the instant invention. In contrast to these references, applicants have found critical relationships, as set forth hereinbelow, which result in highly improved reactor chambers and reactor assemblies for waste water treatment to yield innocuous products of reaction with considerably improved output.

SUMMARY OF THE INVENTION

This invention relates to methods and apparatuses for treating waste water streams at a range of temperatures and pressures in the vicinity of supercritical water conditions. More particularly, the present invention pertains to methods and apparatuses for closely controlling the reaction conditions in a manner to considerably increase the output of reactors for treating waste Water streams as compared to the presently utilized reactors which operate in the vicinity of supercritical water conditions.

In more detail, the present invention pertains to a method of treating a primary stream of waste water containing organic matter, the method comprising the steps of:

(a) heating the primary stream to a temperature between 550°–1100° F.;

(b) mixing the heated primary stream with an amount of oxidant lower than required to completely oxidize the organic matter, but adequate to oxidize a sufficient amount of organic matter to raise the temperature to a selected plateau value in the range of 750°–1,200° F., at a pressure preferably higher than 3200 psia, after the primary stream has been introduced into a front port of an elongate reaction chamber and has been allowed to travel toward a back end of said elongate reaction chamber;

(c) injecting an amount of atomized liquid water per unit time and an amount of oxidant per unit time through a first injection side port downstream in the elongate reaction chamber, the first injection side port located at such distance from the front port that 90–100% of the oxidant injected in the front port and any preceding injection side ports has been reacted with the organic matter, the amount of oxidant injected being effective to reduce the content of organic matter in the stream by a predetermined amount, preferably 3–10% by weight in the primary stream, and the amount of water being such in respect to the amount of oxidant injected, that heat absorbed by the atomized liquid water substantially counterbalances any heat of oxidation released; and (d) repeating step (c) at n-1 following injection side ports until at the nth injection side port, being the last injection side port, the amount of organic matter has been decreased to less than 1% in the primary stream, at which point an amount of atomized liquid water per unit time and an amount of oxidant per unit time are injected through said nth port, the amount of water being such in respect to the amount of oxidant injected, that heat absorbed by the atomized liquid water substantially counterbalances any heat of oxidation released, and the amount of oxidant injected being such as to allow the presence of free oxidant after the organic matter has been substantially completely oxidized.

Preferably, the range of temperatures at which the primary stream is heated in step (a) is 550°–705° F., for concentrated waste water streams. Streams which have a high content of organic matter, more than 10% for example, are considered to be concentrated; This is because in the case of concentrated streams, the rate of reaction is rather high due to the high concentration of organic matter, allowing the use of lower inlet temperatures. On the other hand, in the case of dilute streams, the inlet temperature should be on the high side to increase the rather slow reaction rate, and facilitate achievement of the desired plateau temperature.

Depending on the particular circumstances, the injection of oxidant and atomization of the respective amount of water from injection side ports may be conducted in different modes, such as

- the liquid water is atomized and the oxidant is injected in a direction from the front port to the back end of the reaction chamber;
- the liquid water is atomized and the oxidant is injected in a direction from the back end to the front port of the reaction chamber; or
- the liquid water is atomized in a direction from the back end to the front port of the reaction chamber and the oxidant is injected in a direction from the front port to the back end of the reaction chamber.

Further, in the context of the present invention, the meaning of a port is enlarged to include closely shaped double ports, one of which is used for the oxidant injection, and the other for the water atomization. In the case of a double port, the two individual ports have to be close enough to each other, so that no excessive temperature deviations occur. The individual port for the water atomization should preferably be first (closer to the front port of the reactor) and the individual port for the oxidant injection should preferably be second (closer to the back end of the reactor).

The method of the present invention in a different preferred embodiment may also comprise

- a step of determining Total Oxygen Demand of a secondary waste water stream; and
- a step of mixing the secondary stream with a tertiary waste water stream of known Total Oxygen Demand so as to yield the primary waste water stream of a selected value of Total Oxygen Demand.

Further, in another embodiment of the present invention, the method may comprise

- a step of determining Total Oxygen Demand for the primary stream, and
- a step of controlling the total amount of oxidant injected through all the ports of the reaction chamber in a manner to be higher than that required by said Total Oxygen Demand.

Still in a different embodiment of the present invention, at least part of the water condensed after the back end of the reaction chamber may be re-directed to at least one of said injection side ports.

The method of this invention may also comprise

- a step of detecting oxidant content in effluent gas exiting the back end of the reaction chamber, and if said oxidant content falls outside a selected range of values;
- a step of altering the amount of injected oxidant through the nth injection side port, in a manner to cause said oxidant content in the effluent gas to assume a value falling within the selected range of values.

Further, in an alternate embodiment, the method of this invention may comprise

- a step of detecting Total Organic Carbon content in effluent liquid exiting the back end of the reaction chamber, and if said effluent liquid is off-specification by the Total Organic Carbon content exceeding a selected value;
- a step selected from the group consisting of
  - operating a diverter valve to send said off-specification effluent liquid to a segregated collection tank,
  - raising the plateau temperature,
  - lowering the rate of feeding the primary stream into the reaction chamber,
  - lowering the organic matter content in the primary stream, increasing the oxidant and the respective atomized water entering the reaction chamber through at least one of said injection side ports, and
  - a combination thereof,
- until the Total Organic Carbon content falls back under the selected value.

Also, in a still different embodiment, the method of the present invention may comprise

- a step of detecting carbon monoxide content in effluent gas exiting the back end of the reaction chamber, and if said effluent gas is off-specification by the carbon monoxide content exceeding a selected value;
- a step selected from the group consisting of
  - operating a diverter valve to send said off-specification effluent gas to a flare for oxidizing further said carbon monoxide to carbon dioxide,
  - raising the plateau temperature, lowering the rate of feeding the primary stream into the reaction chamber,
  - lowering the organic matter content in the primary stream, increasing the oxidant and the respective atomized water entering the reaction chamber through at least one of said injection side ports, and
  - a combination thereof,
- until the carbon monoxide content falls back under the selected value.

In order to destroy ammonia which may be formed during the process, the method of the present invention may further comprise a step of adding a solution of sodium or other metal nitrite or nitrate, or in general a nitrite or nitrate compound, through an addition port located between the nth port and the back end of the reaction chamber.

In a different embodiment of the present invention, the oxidant comprises hydrogen peroxide in at least one of the injection ports, including the front port of the elongate reaction chamber.

The present invention also pertains to a reactor assembly for treating a primary waste water stream containing organic matter, comprising:

- an elongated reaction chamber, the reaction chamber having a front port, a back end, a primary reaction zone, and a secondary reaction zone;
- heating means for heating the primary stream to a temperature between 550°–1200° F.;
- mixing means for mixing the heated primary stream with oxidant;
- front injection means for injecting through the front port the mixed primary stream with said oxidant, the oxidant being in an amount lower than that required to completely oxidize the organic matter, but adequate to oxidize a sufficient amount of organic matter to raise the temperature to a selected plateau value in the range of 750°–1,200° F., at a pressure preferably higher than 3200 psia, after the primary stream has been injected into said front port of the elongate reaction chamber and has been allowed to travel toward the back end of said elongate reaction chamber;
- a first injection side port downstream in the elongate reaction chamber, located at such distance from the front port that 90–100% of the oxidant injected in the front port is reacted with the organic matter by the time it reaches said injection side port;
- first side injection means for injecting an amount of atomized liquid water per unit time and an amount of oxidant per unit time through said first injection side port, in a manner that the amount of oxidant injected is effective to reduce the content of organic matter in the stream by a predetermined amount, preferably 3–10% by weight in the primary stream, and the amount of the water injected is such in respect to the amount of the oxidant injected, that heat absorbed by the atomized liquid water substantially counterbalances any heat of oxidation released;

n-1 following injection side ports, each of the n-1 port ports being at such distance from the front port that 90–100% of the oxidant injected in all previous port is reacted with the organic matter by the time it reaches said injection side port;

(n-1) side injection means for injecting an amount of atomized liquid water per unit time and an amount of oxidant per unit time through each of said n-1 side injection ports, in a manner that the amount of oxidant injected in each port is effective to reduce the content of organic matter in the stream by a predetermined amount, preferably 3–10% by weight in the primary stream, and the amount of the water injected in each of the n-1 ports is such in respect to the amount of the oxidant injected, that heat absorbed by the atomized liquid water substantially counterbalances any heat of oxidation released;

an nth injection side port, being the last injection side port, at such distance from the (n-1)th port that the amount of organic matter has been decreased to less than 1% in the primary stream; and nth side injection means for injecting through said nth port an amount of oxidant per unit time such as to allow the presence of free oxidant after the organic matter has been substantially completely oxidized.

This invention, also pertains to a reactor assembly for treating a primary waste water stream containing organic matter, comprising:

an elongated reaction chamber, the reaction chamber having a front port, a back end, a primary reaction zone, and a secondary reaction zone;

heating means for heating the primary stream to a temperature between 550°–1200° F.;

mixing means for mixing the heated primary stream with oxidant;

front injection means for injecting through the front port the mixed primary stream with said oxidant, the oxidant being in an amount lower than that required to completely oxidize the organic matter, but adequate to oxidize a sufficient amount of organic matter to raise the temperature to a selected plateau value in the range of 750°–1,200° F., at a pressure preferably higher than 3200 psia, after the primary stream has been injected into said front port of the elongate reaction chamber and has been allowed to travel toward the back end of said elongate reaction chamber;

an adequate plurality of available side ports so that a first injection side port downstream in the elongate reaction chamber may be selected at such distance from the front port that 90–100% of the oxidant injected in the front port has reacted with the organic matter by the time it reaches said first injection side port;

n-1 following injection side ports, each of the n-1 ports may be selected at such distance from the front port that 90–100% of the oxidant injected in all previous ports has reacted with the organic matter by the time it reaches said injection side port;

an nth injection side port, being the last injection side port, may be selected at such distance from the front port that the amount of organic matter has been decreased to less than 1% in the primary stream by the time it has reached said nth port;

first side injection means for injecting an amount of atomized liquid water per unit time and an amount of oxidant per unit time through said first injection side port, in a manner that the amount of oxidant injected is effective to reduce the content of organic matter in the stream by a predetermined amount, preferably 3–10% by weight in the primary stream, and the amount of the water injected is such in respect to the amount of the oxidant injected, that heat absorbed by the atomized liquid water substantially counterbalances any heat of oxidation released;

second to (n-1)th side injection means for injecting an amount of atomized liquid water per unit time and an amount of oxidant per unit time through each of said n-1 injection side ports, in a manner that the amount of oxidant injected in each port is effective to reduce the content of organic matter in the stream by a predetermined amount in the primary stream, and the amount of the water injected in each of the n-1 ports is such in respect to the amount of the oxidant injected, that heat absorbed by the atomized liquid water substantially counterbalances any heat of oxidation released;

nth side injection means for injecting through said nth port an amount of oxidant per unit time such as to allow the presence of free oxidant after the organic matter has been substantially completely oxidized.

It should be noted that the term "side port" does not necessarily mean a port on the side of the reactor. It includes equally well ports comprising tubes having smaller diameter than the reactor and extending within the reactor to a specified point, which point conforms to the limitations of the claims, including the required spacing for oxidant and water injection. The starting point of these tubes may be the front end, the back end, any point on the side of the reactor, or a combination thereof.

DETAILED DESCRIPTION OF THE INVENTION

As aforementioned, this invention relates to methods and apparatuses for treating waste water streams at a range of temperatures and pressures in the vicinity of supercritical water conditions. More particularly, the present invention pertains to methods and apparatuses for closely controlling the reaction conditions in a manner to considerably increase the output of reactor assemblies and reaction chambers for treating waste water streams as compared to the presently utilized devices which operate in the vicinity of supercritical water conditions.

At temperatures over about 705° F. and pressures over about 3200 psia (critical point), liquid water and steam become one phase. This phase behaves and seems to have more of a gas character than of a liquid one at pressures near the critical point. At substantial higher pressures, a more liquid-like behavior is observed with an accompanying increase in solubility inorganic matter. Foreign matter in the water, however, may change the values of these conditions to different degrees. For the purposes of this invention, "supercritical water conditions" are defined as those characterized by a temperature higher than about 705° F. and pressure higher than about 3200 psia. The "vicinity" of supercritical water conditions is defined by the range of temperatures from 550° F. to 1,200° F., and the range of pressures from 2,000 psia to 5,000 psia.

Figure 1:
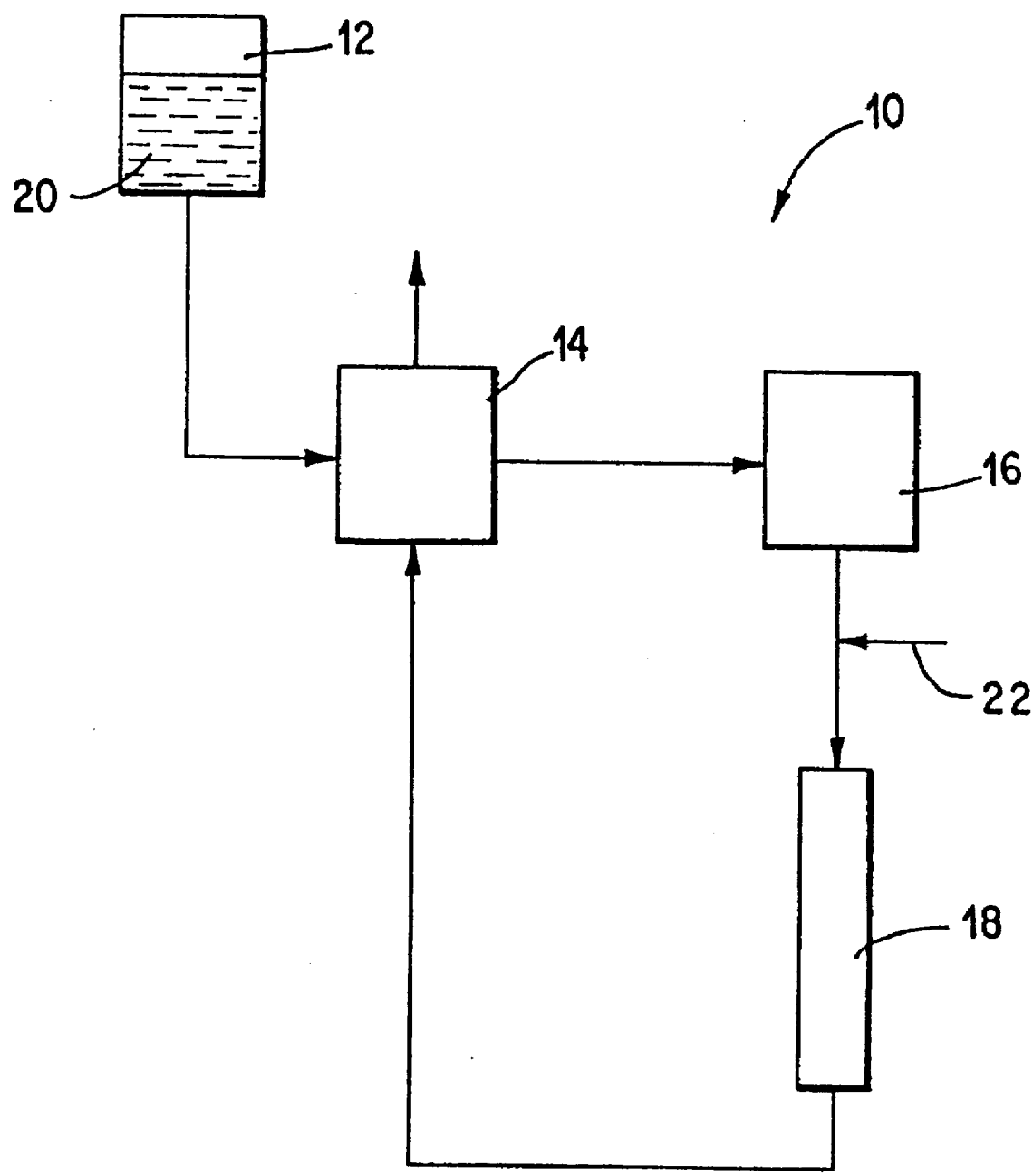
FIG. 1 is a block diagram illustrating a conventional reactor assembly.

Conventional reactor assemblies operating under supercritical water conditions and/or water oxidation conditions in general, are described in detail in the references given earlier, and they are well known to a person of ordinary skill in the art. Thus, they do not require further description in this text. A schematic diagram of a simplified reactor assembly of this type, illustrated in FIG. 1, is sufficient for full understanding of the present invention as detailed hereinbelow.

A conventional reactor assembly 10 comprises a primary tank 12, a heat exchanger 14, a heater 16 and a reaction chamber 18. A primary waste water stream 20 passes initially through the first compartment (not shown) of the heat exchanger 14, then through the heater 16, and enters the reaction chamber 18 under pressure, after it has been mixed with oxidant coming through feed line 22. The organic matter contained in the primary waste stream 20 is oxidized, and in sequence, the hot effluent passes through the second compartment (not shown) of the heat exchanger 14. As well known, heat exchangers usually have two compartments, physically isolated from each other, which however, are heat-communicating. The second compartment transfers heat to the first compartment.

Conventional reactor assemblies may also comprise recirculation arrangements, side ports indiscriminately spaced on the reaction chamber for injecting gases and/or water in undefined amounts.

Figure 2:
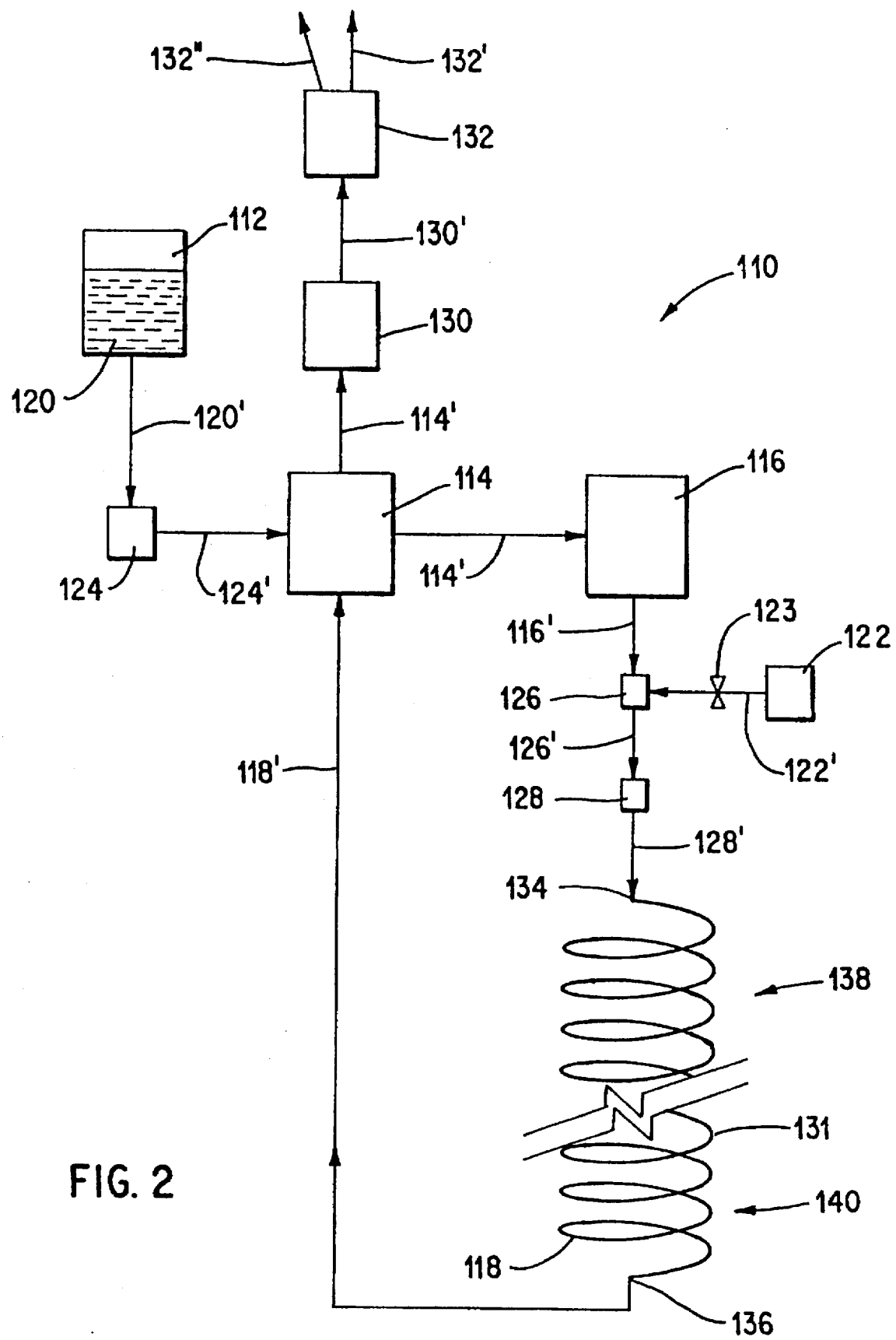
FIG. 2 is a block diagram illustrating a reactor assembly according to a preferred embodiment of the present invention.
Figure 3:
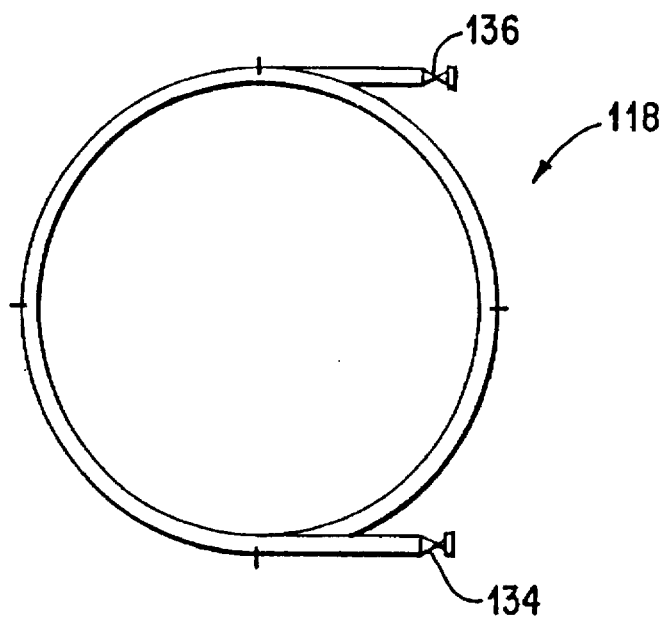
FIG. 3 illustrates schematically the top view of the reaction chamber utilized in the embodiment of FIG. 2, according to the present invention.
Figure 4:
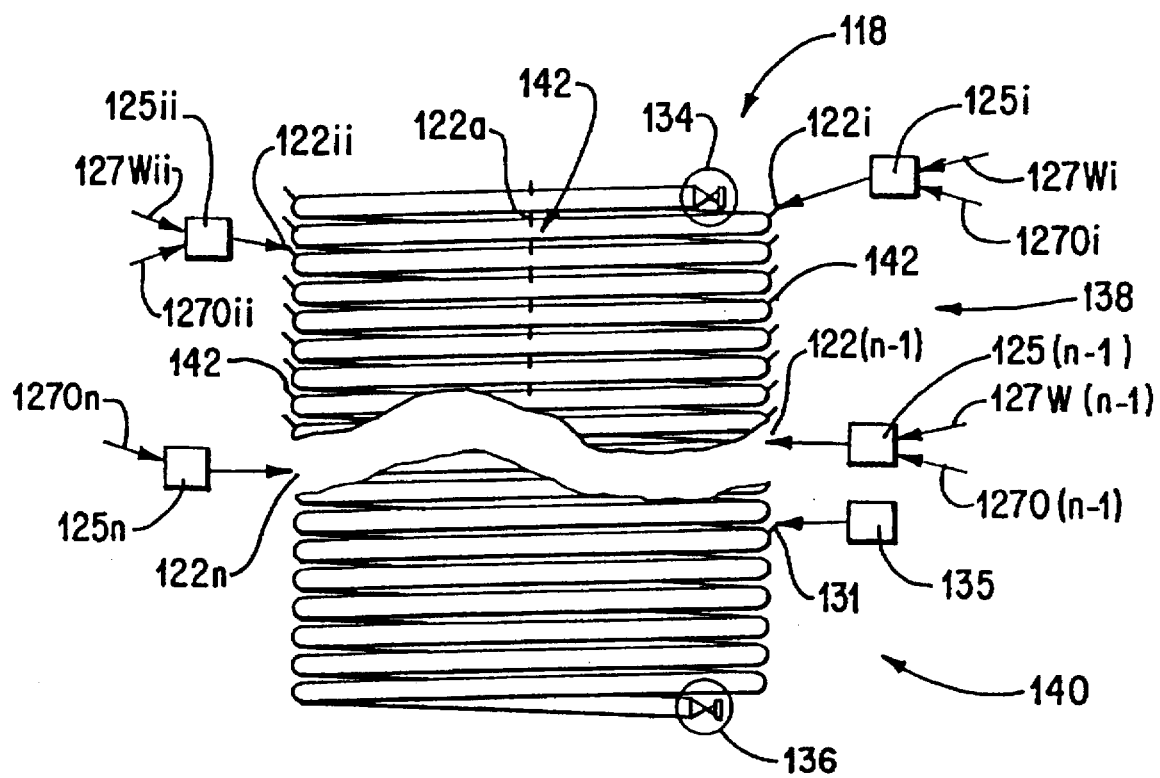
FIG. 4 illustrates schematically the top view of the reaction chamber utilized in the embodiment of FIG. 2, according to the present invention.

According to a preferred embodiment of the present invention, better shown in FIGS. 2, 3, and 4, the reaction chamber assembly 110 comprises a primary tank 112, pressurizing means 124, preferably in the form of a pump, a heat exchanger 114 having a first and a second compartment, which are physically isolated from each other but are heat-communicating, a heater 116, preferably operated by gas, oxidant feeding means 122, mixing means 126, injecting means 128, an elongate reaction chamber 118, preferably tubular, a steam production station 130, and an air cooler 132. These different elements are connected with lines 120', 124', 114', 116', 122', 126', 128', 118', 114", and 130', respectively, as illustrated in FIG. 2. The term "elongate", describing the reaction chamber, merely indicates that the diameter of the tubular reaction chamber is considerably smaller than the length of the reaction chamber, preferably by a factor of 10 or more. FIG. 3 represents the top view, while FIG. 4 represents the side view of the coiled reaction chamber 118.

The reaction chamber 118 has a front end or front port 134, a back end 136, a primary reaction zone 138, and a secondary reaction zone 140. Although it is shown in this embodiment as being tubular and coiled, having a considerably smaller diameter than its length, other configurations may also be used. For example, the reactor may be a straight vessel having a diameter to length ratio of a considerably higher value.

An adequately large number of available side ports 142 are disposed predominately throughout the length of the primary reaction zone 138, but some also on the secondary reaction zone 140. The available side ports for example, may be positioned every ¼ or every ½ or every ¾ or every 1 or more turns depending on the particular circumstances. They may also be positioned at more frequent intervals at the beginning of the primary reaction zone, closer to the front port 134 of the reaction chamber 118, and at less frequent intervals toward the end of the primary reaction zone 138, closer to the back end 136 of the reaction chamber 118. It is only important that there is an adequate number of available ports so that some of the available ports may be selected as injection side ports such as to fulfill the requirements of this invention, as explained in detail hereinbelow. Although the injection ports are named as side ports, they do not necessarily have to have an entry to the reactor through its side. They may be in the form of tubes, smaller in diameter than the diameter of the reactor, enter the reactor from the front or the back end, and extend to the point within the reactor at which the injection has to be made according to this invention.

Thus, a first injection side port 122$i$ downstream in the elongate reaction chamber is selected at such distance from the front port that 90–100% of the oxidant injected in the front port has reacted with the organic matter by the time it reaches said first injection side port. Then, n-1 side ports are also selected at such distance from the front port that 90–100% of the oxidant injected in all previous ports has reacted with the organic matter by the time it reaches said injection side port, where n is an integer, preferably in the range of 1–10, and more preferably in the range of 1 and 5. Finally, an nth injection side port, being the last injection side port, is selected at such distance from the front port that the amount of organic matter has been decreased to less than 1% in the primary stream by the time it has reached said nth port.

The number of selected injection side ports, and the value of n, increases as the concentration of organic matter in the primary stream increases, if other variables remain constant. The advantages of the instant invention are strongly manifested when the concentration of organic matter in the primary stream is higher than about 3% by weight, in which case, at least one selected injection side port becomes necessary for improved productivity of the reaction chamber. Productivity of the reaction chamber, for the purposes of this invention, is defined as the weight of the organic matter oxidized (in lbs.), divided by the volume of the two reaction zones (primary and secondary in cubic feet), for a constant flow of primary stream. In other words, productivity is the amount of organic matter that the reaction chamber can destroy per unit volume of reaction chamber. One major objective of the present invention, as already mentioned, is to improve the productivity of the reaction chamber.

Previous reactors based on Supercritical Water Oxidation were limited to lower organic concentrations, and therefore, lower initial reaction rates, since reaction rates depend on both reactant concentration and reactant temperature. The present invention allows for enhancement of reaction rates by introducing a more concentrated waste stream into the reactor. Since the initial reactor rates increase greatly as the organic reactant concentration is increased, a reaction assembly as described in this invention can, for a given reactor length designed for a specific inlet concentration, process multiples of said designed inlet concentration with almost no increase in reactor length. The reaction rate increase offsets the feed concentration increase and results in satisfactory effluent without substantially increasing the reactor length. Prior art devices cannot take advantage of this reaction rate increase resulting from high feed concentrations, due to the extremely high temperatures created when all of the organics are oxidized. The present invention controls the temperature increase by the injection of critical amounts of oxidant and water at critical positions of the reactor. This control enables the reactors of this invention to take advantage of the increased reaction rates at higher inlet concentrations and, as a result, increase the productivity of a given reactor volume. For lower concentrations of organic matter in the waste water, the reactor productivity is increased, according to the present invention, by operating at higher reactor inlet temperatures than would be possible without the critically controlled injection of oxidant/water at critical positions of the reactor.

The selection of the injection ports may be made in a number of methods, such as for example computer simulation which is well known to the art. However, it is preferable to be done experimentally. In this respect, all or most of the available side ports 142 are furnished with sampling orifices (not shown) for chemical analysis of the stream, and thermocouples (not shown) for measuring the temperature of the stream, preferably at each available side port.

The primary stream is brought to a desired pressure, preferably in the range of 2,000 to 5,000 psia, more preferably above 3,200 psia, and even more preferably in the range of 3,500 to 4,500 psia, with pressurizing means 124, such as a displacement pump for example, and it is heated initially by heating means 116, which is preferably a gas heater, to a desired temperature between 550°–1200° F., and more preferably in the range of 550°–705° F. Later on, after the operation has started, heat is also provided by the heat exchanger 114 as hot effluent coming off the back end of the reaction chamber 118 passes through the heat exchanger 114 by means of feed line or conduit 118'. In sequence, the primary stream is fed through line or conduit 116' to mixing means 126, where it may be mixed with oxidant from oxidant feeder 122, though line or conduit 122'.

The oxidant may be any conventional source of oxygen, such as for example oxygen-containing-gas, air, oxidizing agent, such as for example hydrogen peroxide, ozone, persulfates, permanganates, nitrates, and their corresponding acids, oxyacids of chlorine and their corresponding salts, hypochlorites, chlorous acid and chlorites, chlorates, perchlorates, and their corresponding acids. Mixtures of oxidants may also be used in substantial or even in catalytic quantities, as for example disclosed in U.S. Pat. No. 5,232,604 (Swallow et al.). The composition of oxidant may differ from port to port, if so desired.

For the purposes of this invention, oxygen, hydrogen peroxide, and mixtures thereof are highly preferred. A free radical generating material such as hydrogen peroxide is often a useful addition to the quench points. A preferably 28–35%, and more preferably 30 to 33% percent by weight hydrogen peroxide solution in water contains the right ratio of water to oxidant to stabilize the process temperature to its original value (same temperature before and after the oxidation reaction, which temperature has substantially the value of the plateau temperature). The addition of hydrogen peroxide shortens the time required for a given destruction level. Further, hydrogen peroxide can be used in place of oxygen in the injection system. This allows for a simpler injection system, since the hydrogen peroxide is mixed into the water before injection, and only one pump is needed for both oxidant and cooling or quenching water.

The mixture of the primary stream with oxidant enters then the reaction chamber through its front port 134, after it passes through front injection means 128 and line or conduit 128'. An oxidant valve 123, in the line 122', is initially closed but it is opened slowly while the temperature is monitored in the available side ports. Also, at the same time, samples of reaction mixture are being taken from the same or other respective side ports, and analyzed for oxidant content. The valve 123 continues being opened until the temperature at least at one available side port reaches a predetermined desired value in the range of 750°–1,200° F., preferably 900°–1100° F., and 90–100% of the oxidant has reacted with organic matter contained in the stream as the stream is travelling toward the back end 136 of the elongate reactor 118. This predetermined temperature has substantially the same value as the value of the plateau temperature as better described at a later section of this discussion, and illustrated in FIGS. 13 and 14. The pressure inside the reaction chamber is preferably maintained in the vicinity of supercritical water pressure, preferably at 3,200 psia or above, and more preferably in the range of 3,500 to 4,500 psia.

The available side port 122$a$ closest to the front injection port fulfilling this requirement may be selected as the first injection side port, if so desired. Injection means 125$i$, however, in this particular example, are attached to the next available side port closest to side port 122$a$, preferably downstream, toward the back end of the reaction chamber to ensure the fulfillment of the above mentioned requirement of temperature and amount of reacted oxidant. Of course, the injection means 125$i$ may be attached to the side port 122$a$. Thus, in this particular case, the first injection port is considered to be 122$i$.

In sequence, oxidant from line or conduit 127O$i$ starts being injected through the first injection side port 122$i$ in an amount effective to reduce the amount of the organic matter contained in the primary stream by a predetermined amount, preferably 3–10%, more preferably by 3–7%, and even more preferably by 3–5% by weight, calculated as total organic matter in the primary stream at each stage. For example, if the primary stream at the position of the injection port 122$i$ contains 23% organic matter by weight, the oxidant injected by injection means 125$i$, through first injection port 125$i$, into the reaction chamber 118 is adequate to change the stream so that from 23%, it contains now preferably 20–13%, more preferably 20–16%, and even more preferably 20–18%.

At the same time that this effective amount of oxidant is injected into the reaction chamber, liquid water from line 127W$i$ is also injected through the same first injection side port, in an amount effective to counterbalance the heat produced by the oxidation of organic matter. Some corrections may be made for heat losses in order to inject the proper amount of water, so that the temperature does not exceed substantially a desired plateau value. Depending on the degree of atomization of the injected water, as well as the direction of injection, the temperature of the primary stream moving from one port to a next port may have a smaller or larger swing, but its maximum value does not exceed substantially the temperature plateau value. According to the present invention, this temperature swing or variation is minimized. It is critical that the values that the temperature assumes through the length of the reactor remain as close as possible to the plateau temperature without substantially exceeding it. The plateau value is substantially reached when 90–100% of the oxidant injected from a given side port has been consumed. At that point, the use of a new side port for injection is appropriate. When heat is absorbed faster by atomization of water, than heat is released by the oxidation of organics in the waste stream, a temperature drop occurs at each injection side port during the simultaneous introduction of both oxidant and water. This is less preferable according to the present invention, and the temperature drop may be minimized or eliminated by decreasing the degree of atomization of the injected water, as well as by injecting the water in a direction from the front end of the reaction chamber toward the back end. The temperature then increases until at the next side port it reaches a value substantially equal to the plateau value, at which point a new simultaneous injection of oxidant and water takes place. If, on the other hand, the reaction of the oxidant with the organics in the primary stream raises the temperature faster than what the injected water may counterbalance, then increase in the atomization of water is appropriate, as well as injection of the water in a direction from the back end of the reaction chamber toward the front end of the reaction chamber.

The first available side port 122$ii$ at which 90–100% of the oxidant coming from all ports prior to port 122$ii$ has been consumed is selected as the second injection side port. At this point, second injection means 125$ii$ are attached to the second injection port 122$ii$.

Again as with the previous port, oxidant from line or conduit 127O$ii$ starts being injected through the second injection side port 122$ii$ in an amount effective to reduce the amount of the organic matter contained in the primary stream by a predetermined amount, preferably 3–10%, more preferably by 3–7%, and even more preferably by 3–5% by weight, calculated as total organic matter in the primary stream at each stage. For example, if the primary stream at the position of the injection port 122$ii$ contains 18% organic matter by weight, the oxidant injected by injection means 125$ii$, through second injection port 125$ii$, into the reaction chamber 118 is adequate to change the stream so that from 18%, it contains now preferably 15-8%, more preferably 15-11%, and even more preferably 15-13%.

At the same time that this effective amount of oxidant is injected into the reaction chamber, liquid water from line 127W$ii$ is also injected through the same second injection side port, in an amount effective to counterbalance the heat produced by the oxidation of organic matter. Some corrections may be made for heat losses in order to inject the proper amount of water, so that the temperature is maintained at or around a desired plateau value.

Further injection ports, up to an (n-1)th port 122(n-1), are selected from the available side ports in the same manner as described for the second injection port. Injection means 125(n-1), fed by lines 127O(n-1) for oxidant and 127W(n-1) for water are attached to the selected injection side port 122(n-1) for injecting oxidant and water into the reactor in the same manner as in the case of the second injection side port 122$ii$.

Finally, an nth injection side port 122$n$ is selected, such that the organic matter in the reacted stream has been reduced to less than 1% at the position of the nth injection side port. At this nth port, injection means 125$n$ are attached, which are fed by oxidant line 127O$n$. Since the amount of organic matter to be oxidized is very little at this point, no water is needed to maintain the plateau temperature. The amount of oxidant injected through the nth injection side port 122$n$, is such as to allow the presence of free oxidant after the organic matter has been substantially completely oxidized to carbon dioxide.

The zone at which the organic matter content is 1% or higher is defined for the purposes of this invention as the primary reaction zone 138. Reactions at this zone 138 take place rather fast. In contrast, reactions at the following length of the reaction chamber 118, the secondary reaction zone, take place very slowly, due to the fact that the concentration of at least one type of reactant is very small, and to the fact that in most cases, reaction products which are more difficult to oxidize are produced, such as for example acetic acid and ammonia. Thus, although about 90% of the organic matter is destroyed in the primary reaction zone 138, the length of the secondary reaction zone 140 may be even equal or larger as compared to the length of the primary reaction zone. Available side ports are preferably also constructed on the reaction chamber 118 at the secondary reaction zone region. These may be used for temperature monitoring, sampling to detect the progress of the last stages of oxidation of the organic matter, introduction of small amounts of additives to help in the destruction of relatively stable reaction products, such as ammonia, or acetic acid for example, and the like, as it will be seen later in this discussion. The available side ports in the secondary reaction zone may be also used to determine the appropriate length of the secondary reaction zone according to the required specifications for effluent gases.

The reaction chamber 118 described above, characterized by the judicious selection criticalities of the position of the injection side ports, as well as the judicious criticalities of the oxidant/water ratios, amounts, and relations to the continuous oxidation of the organic matter, has a considerably improved productivity under the desired conditions of operation as compared to conventional reaction chambers in which the injection side ports for introducing oxidant-containing gases and/or water have been installed indiscriminately.

The reaction chamber of this invention, having a plurality of available side ports, as well as injection side ports, may very well be used itself in treating waste water, after the selection of the injection side ports. Alternately, it may be used just to determine the position of side ports regarding a particular waste water stream an a set of conditions, so that an appropriate reaction chamber may be built, which comprises mainly the injection ports, with just a few available side ports to determine different desired parameters.

In different chemical treatment processes, there are also produced hazardous waste water streams which have rather consistent composition. In such cases, it is worthwhile to construct a reactor assembly comprising a reaction chamber having fixed injection ports, which reactor is dedicated to treat said stream of rather constant composition, as described above, by using an experimental reaction chamber having numerous closely spaced available side ports. On the other hand, if the reaction chamber is to handle a variety of streams having drastically different compositions and concentrations of organic matter, it is preferable to utilize a reaction chamber with a high multiplicity of available side ports, so that an operator may be able to select the appropriate injection side ports, as described earlier.

The operation of a reactor assembly comprising a reaction chamber of either kind, according to this invention, is explained in detail hereinbelow.

A primary stream of waste water 120 containing organic matter in 15 solution or dispersion or both, is fed through feed line or conduit 120' to pressurizing means 124, from a primary tank 112. Pressurizing means 112 are preferably in the form of a pump, such as displacement pump, for example. The pressure applied should be in the vicinity of supercritical water conditions, as defined above, but preferably is in the range of over 3,200 psia, and more preferably in the range of 3,500 to 4,500 psia.

The primary stream is then passed through heat exchanger 114. When the operation just starts, no temperature increase is realized in the heat exchanger 114. However, at later stages of the operation, hot effluents from the reaction chamber 118, passing through line 118' transfer a considerable amount of heat to the pressurized primary stream, as it will be explained hereinbelow.

In sequence, the pressurized primary stream is passed through heating means 116, preferably in the form of a gas heater. The primary stream is heated to a desired temperature in the range of 550 to 1,100° F. The desired temperature depends on a number of factors, including but not limited to the particular design of the reactor, the type of the stream, and more importantly the content of organic matter in the stream. If the content of organic matter in the stream is high, lower initial temperatures are preferable, while if the concentration of organic matter in the stream is relatively low, higher temperatures are preferable.

After the stream has been heated to the desired temperature, it is introduced to the mixing means 126, where it is mixed with oxidant coming from the oxidant source 122 through line or conduit 122'. The amount of oxidant introduced per unit time (oxidant flow) is regulated by valve 123 in a manner that it is lower than that required to completely oxidize the organic matter, but adequate to oxidize a sufficient amount of organic matter to raise the temperature to a selected plateau value preferably in the range of 750°–1,200° F., at a pressure preferably higher than 3200 psia, after the primary stream has been injected into the front port 134 of the elongate reaction chamber 118, and has been allowed to travel toward the back end 136 of said elongate reaction chamber 118, at a position where the first injection side port 122$i$ is located. The mixture of the primary stream with the oxidant, attains the desired temperature having a value at or around the palteau temperature and consumes 90–100% of the oxidant present by the time it reaches the first injection side port 122$i$, which has been selected as described hereinabove.

In sequence, oxidant from line or conduit 127O$i$ starts being injected through the first injection side port 122$i$ in an amount effective to reduce the amount of the organic matter contained in the primary stream by a predetermined amount, preferably 3–10%, more preferably by 3–7%, and even more preferably by 3–5% by weight, calculated as total organic matter in the primary stream at each stage. For example, if the primary stream at the position of the injection port 122$i$ contains 23% organic matter by weight, the oxidant injected by injection means 125$i$, through first injection port 125$i$, into the reaction chamber 118 is adequate to change the stream so that from 23%, it contains now preferably 20–13%, more preferably 20–16%, and even more preferably 20–18%.

At the same time that this effective amount of oxidant is injected into the reaction chamber, liquid water from line 127W$i$ is also injected, preferably in an atomized manner, through the same first injection side port, in an amount effective to counterbalance the heat produced by the oxidation of organic matter. Some corrections may be made for heat losses in order to inject the proper amount of water, so that the temperature is maintained at or around a desired plateau value.

At the same time that this effective amount of oxidant is injected into the reaction chamber, liquid water from line 127W$i$ is also injected through the same first injection side port, in an amount effective to counterbalance the heat produced by the oxidation of organic matter. Some corrections may be made for heat losses in order to inject the proper amount of water, so that the temperature is maintained at or around a desired plateau value.

By the time the stream modified as aforedescribed reaches the second injection side port 122$ii$, 90–100% of the oxidant coming from all ports prior to port 122$ii$ has been consumed.

Again as with the first injection side port, oxidant from line or conduit 127O$ii$ starts being injected through the second injection side port 122$ii$ in an amount effective to reduce the amount of the organic matter contained in the primary stream by a predetermined amount, preferably 3–10%, more preferably by 3–7%, and even more preferably by 3–5% by weight, calculated as total organic matter in the primary stream at each stage. For example, if the primary stream at the position of the injection port 122$ii$ contains 18% organic matter by weight, the oxidant injected by injection means 125$ii$, through second injection port 125$ii$, into the reaction chamber 118 is adequate to change the stream so that from 18%, it contains now preferably 15–8%, more preferably 15–11%, and even more preferably 15–13%. Of course, these levels of reduction apply to streams which have a high content of organic matter (more than 10%, for example). For these streams, an inlet temperature on the low side (550°–705° F.) of the preferred range of temperatures (550°–1200° F.) is preferably used. For low concentration streams, an inlet temperature on the high side (550°–1200° F.) of the preferred range of temperatures is preferably used.

At the same time that this effective amount of oxidant is being injected into the reaction chamber, liquid water from line 127Wii is also injected, preferably in an atomized manner, through the same second injection side port, in an amount effective to counterbalance the heat produced by the oxidation of organic matter. Some corrections are made for heat losses, by well known to the art techniques, in order to inject the proper amount of water, so that the temperature is maintained at or around the desired plateau Value.

Regarding further injection ports, up to an (n-1)th port 122(n-1), are similarly treated as the second injection side port. Injection means 125(n-1), fed by lines 127O(n-1) for oxidant and 127W(n-1) for water are attached to the selected injection side port 122(n-1) for injecting oxidant and water into the reactor in the same manner as in the case of the Second injection side port 122ii.

Finally, at the position of the nth injection side port 122n, the organic matter in the reacted stream has been reduced to less than 1%. At this nth port, injection means 125n are fed by oxidant line 127On. Since the amount of organic matter to be oxidized is very little at this point, no water is needed to maintain the plateau temperature. The amount of oxidant injected through the nth injection side port 122n, is such as to allow the presence of free oxidant after the organic matter has been substantially completely oxidized to carbon dioxide.

After the primary stream has been oxidized to a major degree as described above in the primary reaction zone, it follows a path in the secondary reaction zone 140, where it is substantially fully oxidized to desired specifications.

The oxidized stream follows then the path of line or conduit 118', passes through heat exchanger 114, where it provides heat to the incoming through line 124' pressurized primary stream, it follows line 114', it goes through an optional steam production station 130, it follows line or conduit 130', and then it passes through a cooling station 132, preferably being an air cooler. The gases follow line 132' and are released to the atmosphere, provided they meet or exceed appropriate State and Federal environmental and safety specifications, well known to the art for each State. The condensed water, follows line or conduit 132" and it is disposed of by also well known to the art methods, such as for example being added to the sewer system, or to a pond, and the like, provided it meets or exceeds appropriate State and Federal environmental and safety specifications. Of course, part of this water may be recirculated and used as a water source for the water injected through the injection ports as specified hereinabove.

If for any reason, the condensed water and the off gasses do not meet or exceed appropriate State and Federal environmental and safety specifications, a number of different actions may be taken until said specifications are met. These actions, methods, and devices for achieving the proper specifications are explained in detail in different embodiments of the present invention.

It has been found by Applicants that the productivity of the reaction chambers of this invention seems to increase unexpectedly if the temperature at which the primary stream enters the reaction chamber 118 is subcritical, and preferably in the range of 550°–705° F., while the plateau temperature is supercritical in the preferable range of 900°–1100° F.

Lower input temperature, of the order of 550°–705° F. for example, allows for more enthalpy rise, and therefore allows for a higher inlet concentration. When the inlet concentration is fairly high, a drop in the inlet temperature does not affect the reactor length significantly, but minimizes the number of injection ports required according to the present invention. Thus, a higher inlet concentration, for a given reactor length and a given number of injection ports, is possible. The lower inlet temperature also places less demand on the heating components.

Figure 5A:
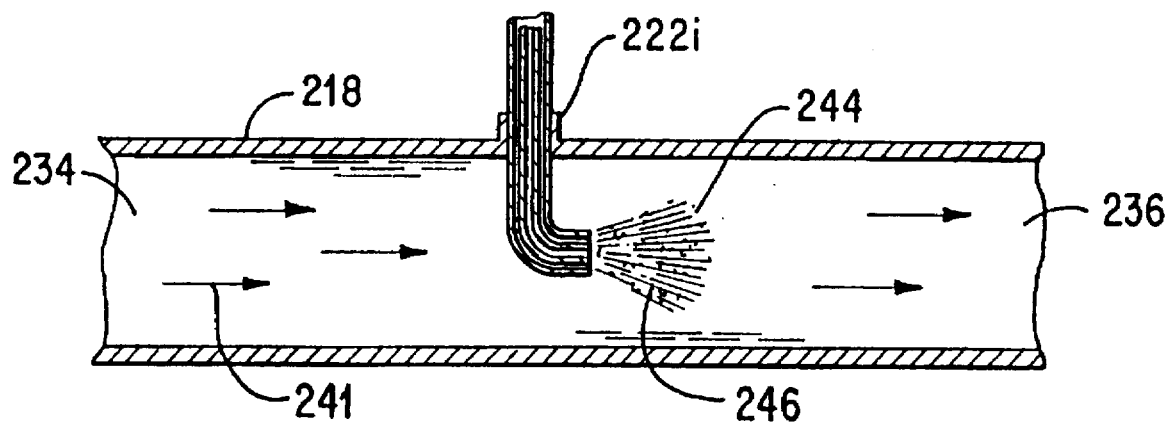
FIG. 5 illustrates schematically different injection modes from injection side ports of a reaction chamber according to the present invention.
Figure 5B:
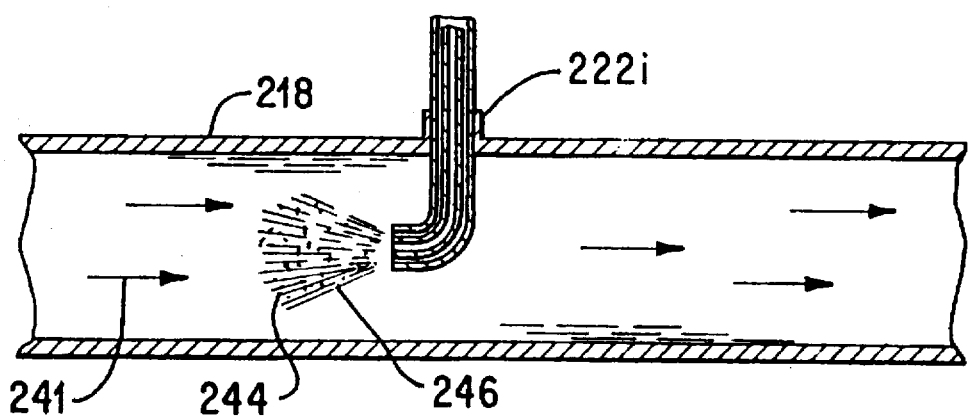
Figure 5C:
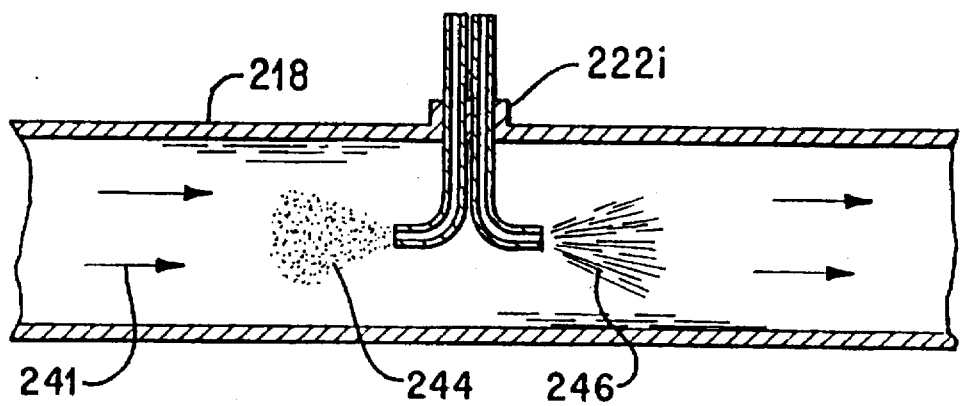

Depending on the particular construction of the reaction chamber and the characteristics of the primary stream, the water 244 may be atomized and the oxidant 246 may be injected in basically three different modes, as better illustrated in FIG. 5, which depicts injection of water and oxidant 246 through the first injection side port 222i, as an example:

in (a) the liquid water 244 is atomized and the oxidant 246 is injected in a direction from the front port 234 to the back end 236 of the reaction chamber 118, this direction being the same as the direction of flow of the primary stream indicated by arrows 241;

in (b) the liquid water 244 is atomized and the oxidant 246 is injected in a direction from the back end 236 to the front port 234 of the reaction chamber 218; and in (c) the liquid water 244 is atomized in a direction from the back end 236 to the front port 234 of the reaction chamber and the oxidant is injected in a direction from the front port 234 to the back end 236 of the reaction chamber 218.

The oxidant and the water may be also injected together, especially if the oxidant is soluble in water, as is the case with hydrogen peroxide, or many other non-gaseous oxidants, discussed in a different section. A considerable advantage, among others, of using a dissolved oxidant in water is that only one pump is needed to raise the pressure of both the oxidant and the corresponding water.

It is possible and it may be desirable to use a combination of the above modes in a multi-injection side port reaction chamber. If for example, the concentration of the organic matter is rather high, for example higher than 25% in the waste water, and the desired plateau temperature is also high, such as for example 1150° F., mode (c) is more appropriate at least at the initial couple of injection side ports. For any remaining ports, mode (a) may be followed. In general, it is important that if the plateau temperature is higher than 1100° F. at supercritical pressures, the injection mode (c) is followed at least in the first injection side port, in order to ensure that the temperature will not rise excessively in any localized region in the vicinity of said at least first port at which the injection of oxidant is conducted.

Atomization of water may be carried out by any conventional techniques, well known in the art. In a simple form, one or more orifices may be used having a diameter of preferably 5–50 mils (1 mil=0.001"). The pressure of incoming water should be higher than the pressure in the reaction chamber 118, preferably at least 50 psia higher, and more preferably at least 100 psia higher. The degree of atomization of water may be controlled by the size of the oriffice, the pressure differential, the structural arrangement with respect to the co-injected oxidant, or any other techniques well known to the art. Of course, the injected oxidant pressure should also be higher than the pressure in the reaction chamber.

Figure 6:
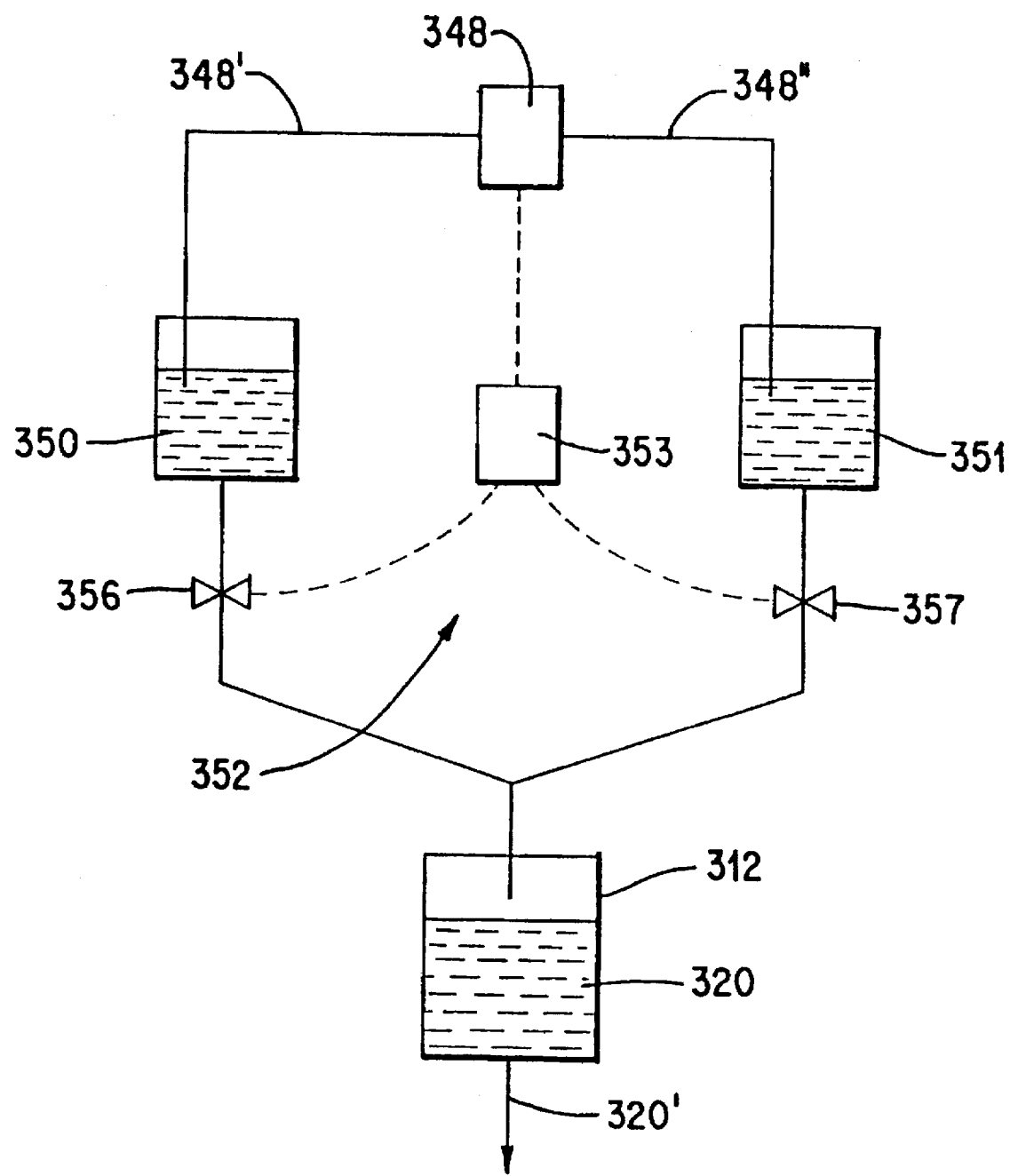
FIG. 6 is a block diagram illustrating the formation of a primary stream from a secondary and a tertiary streams according to a different embodiment of the instant invention.

In a different embodiment of this invention, better illustrated in FIG. 6, there is provided first detection means 348 for determining the Total Oxygen Demand of a secondary waste water stream 350, and the Total Oxygen Demand of a tertiary waste water stream 351, if it is not already known. The tertiary waste water stream 321 may also be plain water, or recycled water from the process of this invention.

Total Oxygen Demand (TOD) is a property very well known to the art, and is defined as the amount of oxygen required to completely oxidize organic matter to carbon dioxide, nitrogen, and water. It may be measured a conventional instrument, such as Model 7800 TOD Analyzer, made by Ionics Corporation, located in Watertown, Mass.

There is also provided second mixing means 352 comprising a primary controller 353, which takes information regarding the TOD for the secondary and tertiary streams, 350 and 351 respectively, and regulates the valves 356 and 357 in a manner to yield the primary waste water stream 320 of a selected value of Total Oxygen Demand. Of course, instead of monitoring the secondary and tertiary streams regarding their TOD values, one of the two may be monitored along with the primary waste water stream, for regulating the TOD of said primary stream.

Formation of a primary stream of a selected value of Total Oxygen Demand is very important because as explained hereinabove, the reaction chambers of this invention have injection side ports positioned in critical spacings on the reaction chamber, and thus, consistency in the stream characteristics is of high importance.

In operation of this embodiment, secondary stream 350 is sampled by detection means 348 through a sampling line 348' for determining its TOD. At the same time, if the TOD of tertiary stream 351 is not known, a sample is taken through sampling line 348", for the same purpose. The analytical information regarding TOD of the two streams is the fed to the primary controller 353 of the mixing means 352. The primary controller 353 regulates the valves 356 and 357, based on the information received from the first detection means 348, in a manner to receive the primary waste water stream 320, which is fed through line 320' to a reactor assembly similar to the one shown in FIG. 2 for further processing as described in detail hereinabove.

Figure 7:
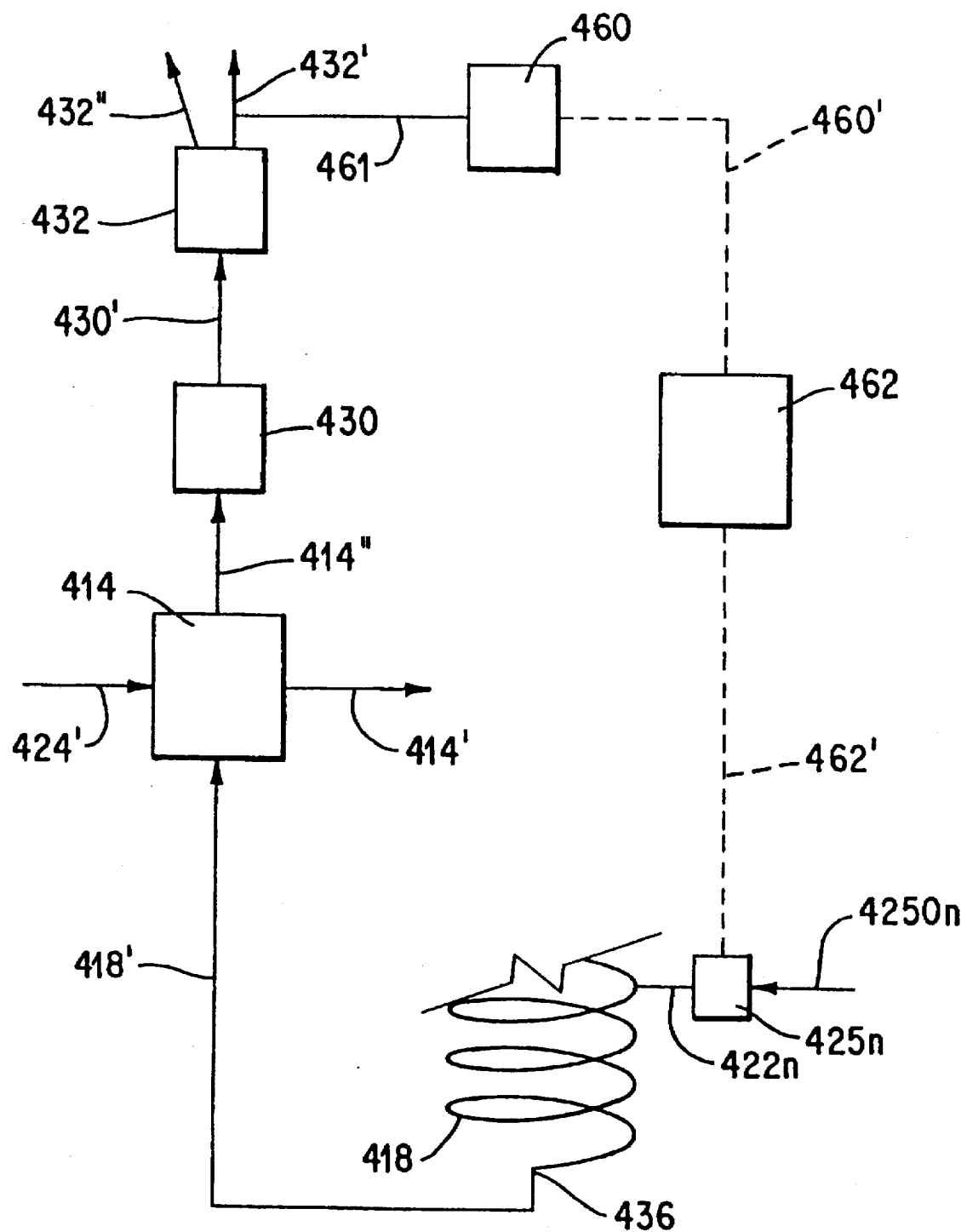
FIG. 7 is a fragmental block diagram illustrating a detection and control arrangement for ensuring the presence of an appropriate excess of oxidant in the effluents, according to another embodiment of the present invention.

In a different embodiment of the present invention, better illustrated in FIG. 7, there is provided a second detection means 460, which samples the effluent or off gas to be released in the atmosphere from line 461, and determines the content of oxidant in the effluent gas. It then provides this information to a first control means 462 through information line 460'. In turn, first control means 462 regulates the injection means 425n of the nth injection side port through information line 462'. Although the sampling line 461 is preferably connected to exit line 432', it may also be connected to any other line following the back end 436 of the reaction chamber 418, such as for example line 418', or line 414", or line 430'.

Oxidant analyzers which may be used as second detection means, are well known in the art. For example, a representative such analyzer is Model DM-234A Oxygen Analyzer, made by Detcon, Inc., located in Woodlands, Tex.

The operation of this embodiment is similar to the operation of the embodiments described thus far, except that second detection means determines the content of oxidant in the effluent gases and provides the information to the first control means 462 which regulates the injection means 425n at the nth injection side port, in a manner to cause said oxidant content in the effluent gas to assume a value falling within a selected range of values, if said oxidant content as determined by the second detection means 460 falls outside the selected range of values.

Figure 8:
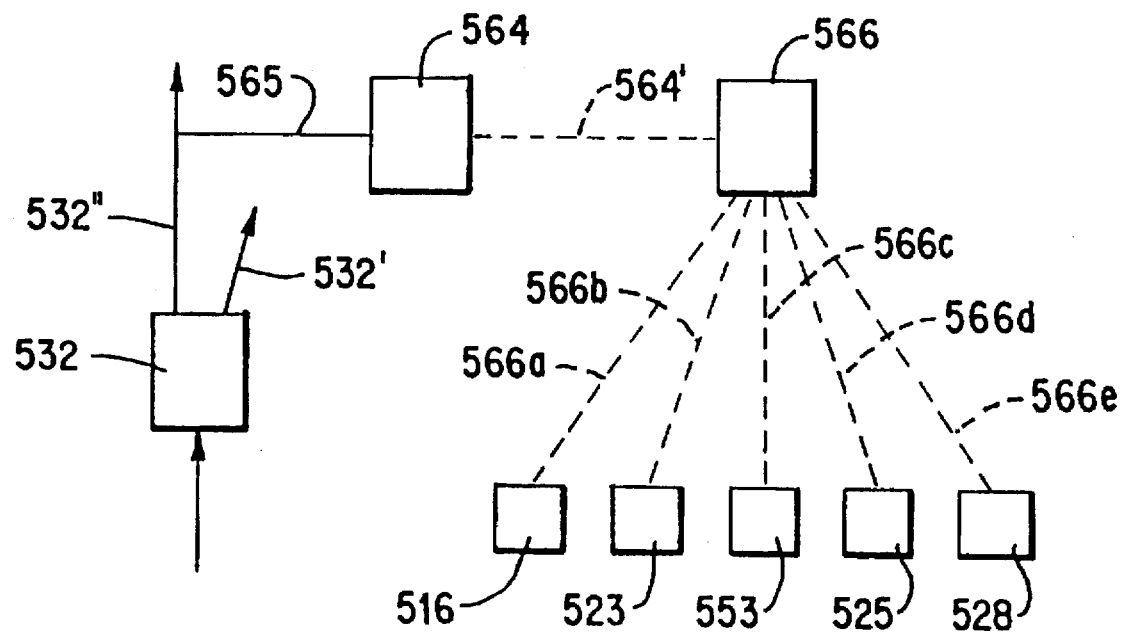
FIG. 8 is a fragmental block diagram illustrating a detection a control arrangement for minimizing the Total Organic Carbon (TOC) in the exiting condensed water, according to another embodiment of the present invention.

In still another embodiment of the invention, better illustrated in FIG. 8, there is provided third detection means 564, which samples the condensed water from exit line 532", through sampling line 561, and determines the content in Total Organic Carbon (TOC). Such detection means are well known to the art as TOC analyzers. For example, a representative such analyzer is Model 6800 TOC analyzer made by Ionics, Inc., located in Watertown, Mass. The TOC information is fed to the second control means 566, which regulates a number of elements of the reactor assembly, shown in FIG. 8 in a block form for purposes of simplicity. These regulated elements include but are not limited the heater 516 through line 566a, the valve 523 which controls the oxidant fed to the primary stream before it enters the front port of the reaction chamber through line 566b, the primary controller 553 through line 566c, one or more of the injection side ports 525 through line 566d, and the front injection means 528 through line 566e.

The operation of this embodiment is similar to the operation of the previously discussed embodiments, except that the third detection means 564 samples the condensed water in line 532" through sampling line 565 to determine the TOC in the condensed water. In turn, it feeds the information to the second control means 566, which regulates the elements of the reactor assembly as discussed above. The second control means 566 may act on one or more of these elements by using an appropriate computerized program, by techniques well known to the art. Of course, manual control is also possible. If the Total Organic Carbon content exceeds a selected value, the second control means regulates one or more of the above described elements in a manner to operate a diverter valve to send off-specification effluent liquid to a segregated collection tank for further treatment at a later point, or raise the plateau temperature, or lower the rate of feeding the primary stream into the reaction chamber, or lower the organic matter content in the primary stream, or increasing the oxidant and the respective atomized water entering the reaction chamber through at least one of said injection side ports, or a combination thereof, until the Total Organic Carbon content falls back under the selected value.

The plateau temperature may be increased by regulating the heater 516 to raise the temperature of the primary stream before it enters the front port of the reaction chamber. The plateau temperature may also be increased by regulating the oxidant valve 523 in a manner to increase the amount of oxidant being mixed with the primary stream before it enters the front port of the reaction chamber.

The rate of feeding the primary stream into the reaction chamber may be lowered by regulating the front injection means in a manner to allow less of the primary stream pass through the front port.

The content of organic matter in the primary waste water stream may be decreased by regulating the primary controller 653 so that the secondary stream and the tertiary stream (better shown in FIG. 6) are mixed in such ratio as to produce a primary stream of lower organic matter content.

The increase of oxidant entering one or more of the injection side ports, with preference to the nth injection side port, may be caused by regulating the respective injection means 525 to allow a higher amount of oxidant to pass through into the reaction chamber.

Figure 9:
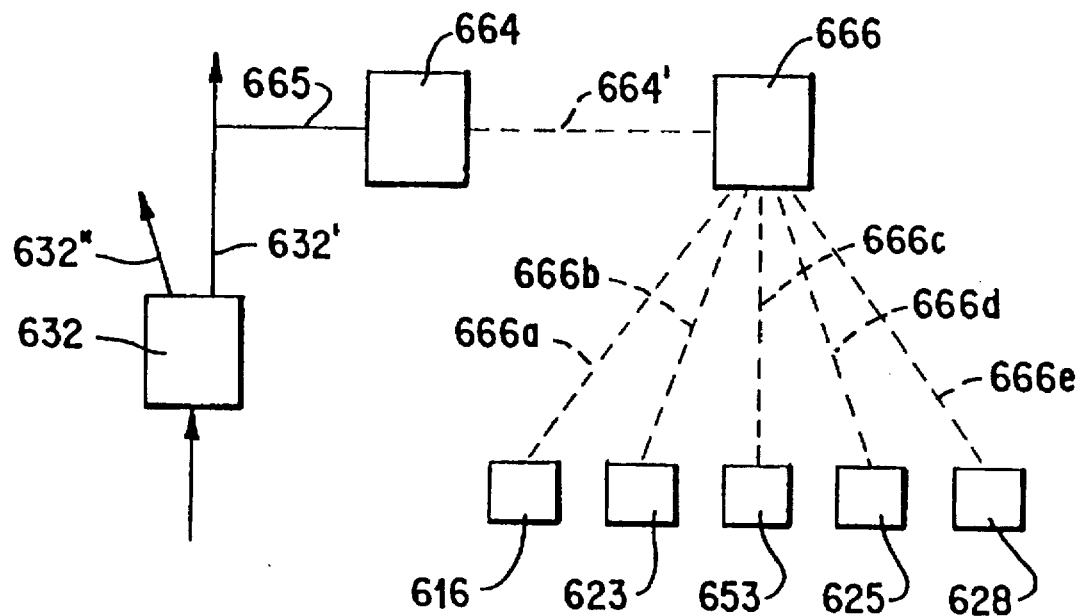
FIG. 9 is a fragmental block diagram illustrating a detection a control arrangement for minimizing the carbon monoxide in the effluents, according to different embodiment of the present invention.

In another embodiment of the present invention, better illustrated in FIG. 9, there is provided fourth detection means 564, which samples the effluent gases from exit line 532', through sampling line 561, and determines the content in carbon monoxide. Such detection means are well known to the art as carbon monoxide analyzers. For example, a representative such analyzer is Model DM-244 CO Analyzer, made by Dercon, Inc., located in Woodlands, Tex. The carbon monoxide content information is fed to the third control means 566, which regulates a number of elements of the reactor assembly, shown in FIG. 9 in a block form for purposes of simplicity. These regulated elements include but are not limited the heater 516 through line 566a, the valve 523 which controls the oxidant fed to the primary stream before it enters the front port of the reaction chamber through line 566b, the primary controller 553 through line 566c, one or more of the injection side ports 525 through line 566d, and the front injection means 528 through line 566e.

The operation of this embodiment is similar to the operation of the previously discussed embodiments, except that the fourth detection means 564 samples the effluent gases in line 532' through sampling line to determine the carbon monoxide content in the effluent gases. In turn, it feeds the information to the second control means 566, which regulates the elements of the reactor assembly as discussed above. The second control means 566 may act on one or more of these elements by using an appropriate computerized program, by techniques well known to the art. Of course, manual control is also possible. If the carbon monoxide content exceeds a selected value, so that the effluent gas is off-specification, the second control means regulates one or more of the above described elements in a manner to operate a diverter valve so as to send the off-specification effluent gas to a flare for oxidizing further said carbon monoxide to carbon dioxide by burning, raise the plateau temperature, or lower the rate of feeding the primary stream into the reaction chamber, or lower the organic matter content in the primary stream, or increasing the oxidant and the respective atomized water entering the reaction chamber through at least one of said injection side ports, or a combination thereof, until the carbon monoxide content falls back under the selected value.

The plateau temperature may be increased by regulating the heater 516 to raise the temperature of the primary stream before it enters the front port of the reaction chamber. The plateau temperature may also be increased by regulating the oxidant valve 523 in a manner to increase the amount of oxidant being mixed with the primary stream before it enters the front port of the reaction chamber.

The rate of feeding the primary stream into the reaction chamber may be lowered by regulating the front injection means in a manner to allow less of the primary stream pass through the front port.

The content of organic matter in the primary waste water stream may be decreased by regulating the primary controller 653 so that the secondary stream and the tertiary stream (better shown in FIG. 6) are mixed in such ratio as to produce a primary stream of lower organic matter content.

The increase of oxidant entering one or more of the injection side ports, with preference to the nth injection side port, may be caused by regulating the respective injection means 525 to allow a higher amount of oxidant to pass through into the reaction chamber.

In still another embodiment of this invention, there is provided fifth detection means for determining the Total Oxygen Demand in the primary stream, and fourth control means for controlling the total amount of oxidant injected through all the ports of the reaction chamber in a manner to be higher than required by said Total Oxygen Demand. The operation of this embodiment is similar to the operation of the previous embodiments and needs no further explanations.

In a different embodiment of this invention, there is also provided an addition port 131 (FIG. 4), preferably in the secondary reaction zone 140, which is actually between the nth injection side port and the back end of the reactor 136. A solution of sodium nitrite or other nitrite or nitrate compound may be added to the chamber 118 by means of first addition means 135 in order to destroy any ammonia present, which may be detected in line 132' of the effluent gases. In the operation of this embodiment, sixth detection means (not shown) samples the effluent gas from exit line 132', and determines the amount of ammonia present. In turn, it feeds the information to a fifth control means (not shown), which regulates the first addition means 135. If there is ammonia present over a specified limit, the first addition means is caused by the fifth control means to allow nitrite or nitrate solution to be added to the reaction chamber 118 through addition port 131, until the ammonia present falls below said specified limit. Nitrite compounds are preferable as compared to nitrate compounds, and sodium nitrite is more preferable, as being more effective in destroying ammonia without producing nitrogen oxides.

In still another embodiment of the present invention, oxygen is used as the oxidant to be mixed with the primary waste water stream, and a solution of preferably 28–35%, and more preferably 30–33% of hydrogen peroxide in water, by weight, is used in at least one side injection port. At these concentrations, the reactive oxygen and the heat-absorbing water are at such proportions that the overall temperature of the reacting mixture does not exceed the plateau value, or needs only small adjustment, without the need of additional water injection. Furthermore, the hydrogen peroxide helps the rate of oxidation considerably. It should be understood, however, that hydrogen peroxide may be used exclusively as the oxidant, or in any proportion with oxygen or other oxidant, in any or all ports, including the front port.

Figure 10:
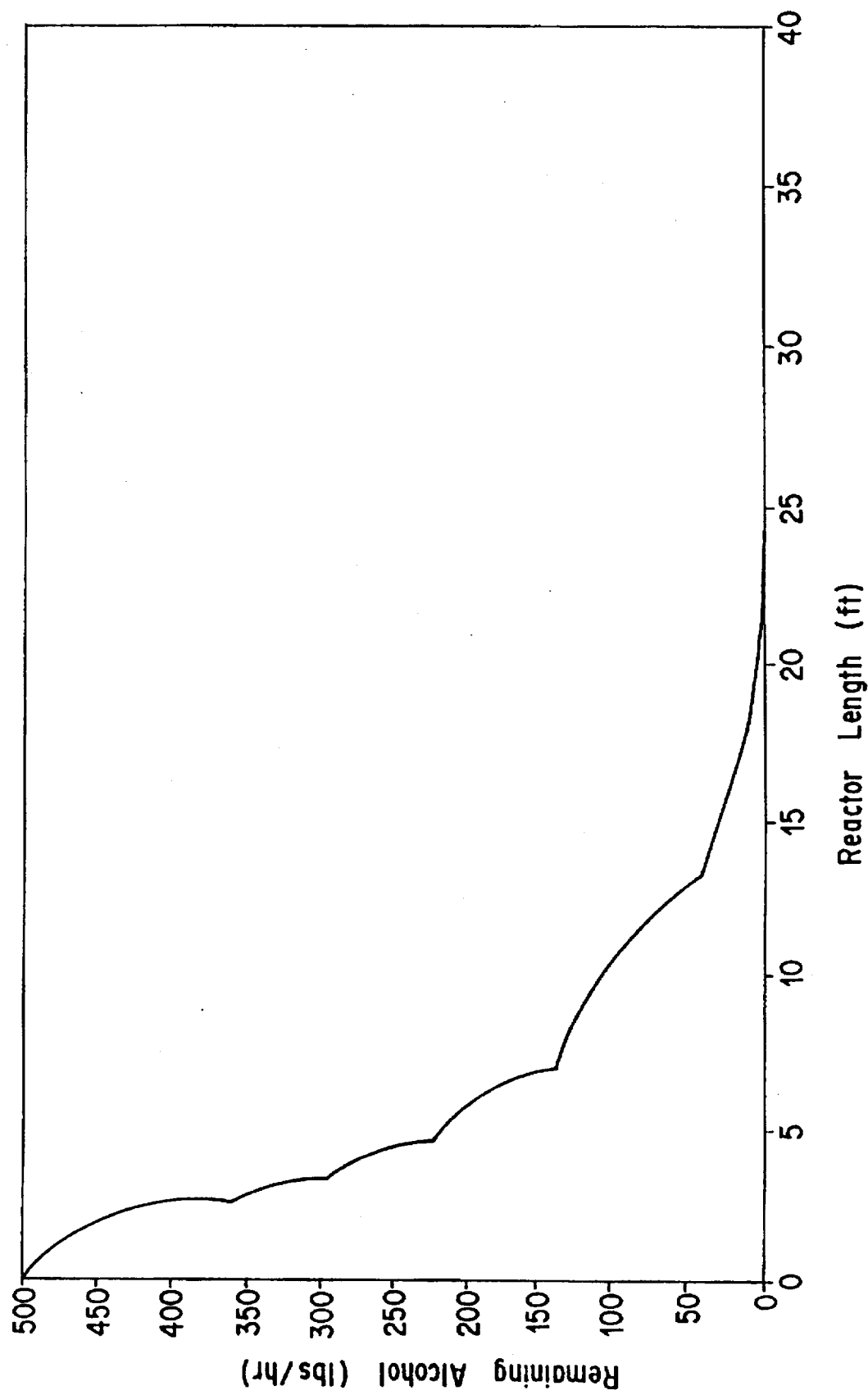
FIG. 10 represents a graph of alcohol in a reactor of the present invention versus length of reactor, the graph having been produced by computer simulation.

FIGS. 10–13 illustrate by computer simulation the oxidation with oxygen of an exemplary alcohol at a concentration of 20% in a waste water stream entering the reactor at 650° F., according to the present invention. FIG. 10 shows the alcohol remaining in lbs per hour versus reactor length in feet. The discontinuity points correspond to positions of injection side ports.

Figure 11:
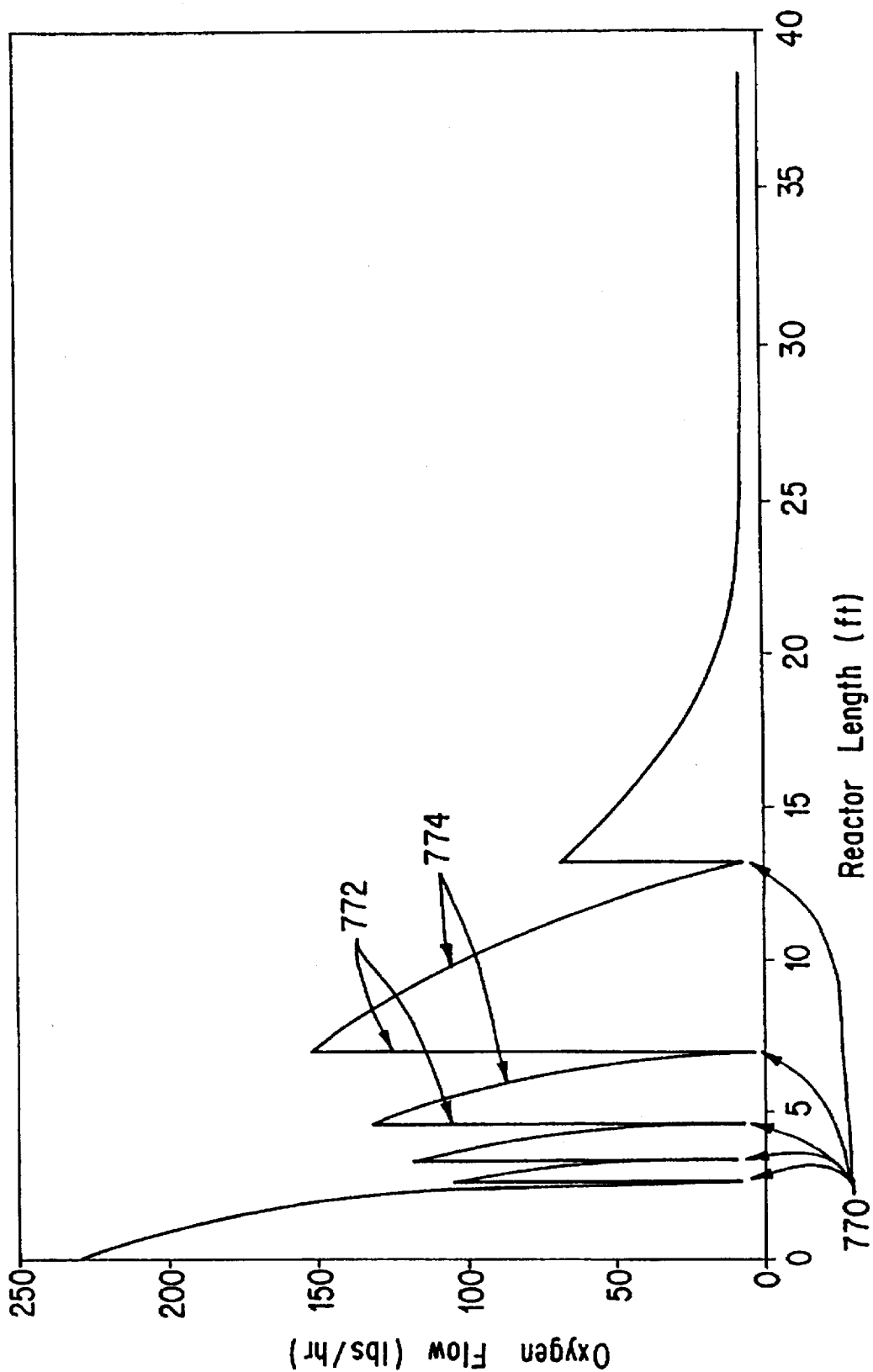
FIG. 11 represents a graph of oxygen flow in the reactor used in FIG. 10 versus length of reactor, the graph having been produced by computer simulation.

FIG. 11 illustrates the oxygen flow versus reactor length. Points 770 correspond to the discontinuities in FIG. 10, and to positions of side ports, where oxygen and water are injected. The oxygen flow increases rapidly at each injection side port, as illustrated by the steeply rising lines 772, while it sequentially decreases more gradually during the oxidation of the alcohol as illustrated by curves 774, until about 90–100% of the oxygen present has been consumed.

Figure 12:
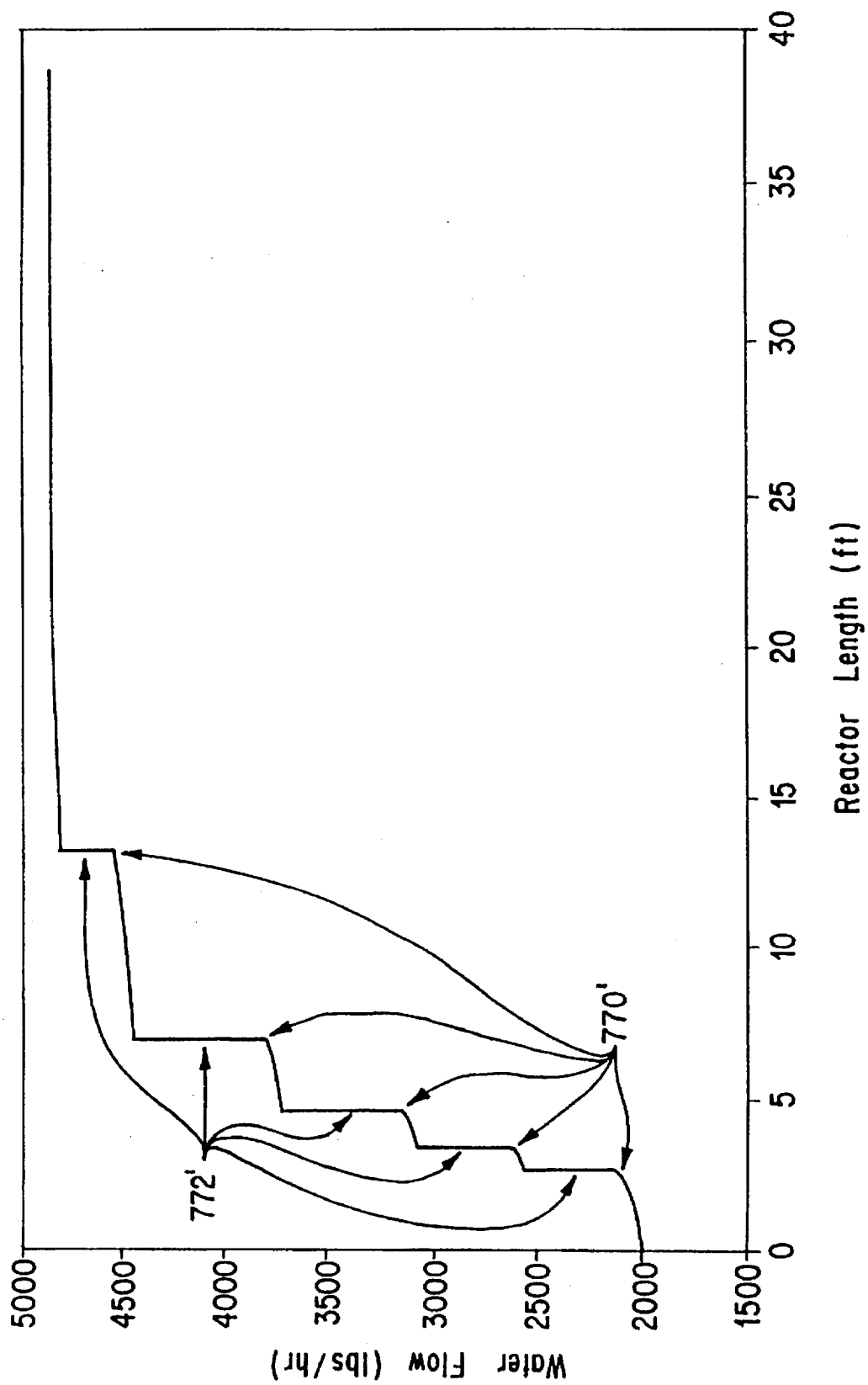
FIG. 12 represents a graph of water flow in the reactor used in FIG. 10 versus length of reactor, the graph having been produced by computer simulation.

FIG. 12 illustrates the water flow versus reactor length. The points 770' correspond also to the discontinuities in FIG. 10, and to positions of side ports, as the respective points 770 of FIG. 11, where oxygen and water are injected. The water flow increases rapidly at each injection side port, as illustrated by the steeply rising curves 772', while it sequentially rises slightly, due to water formation by the oxidation of organic matter in the waste stream.

Figure 13:
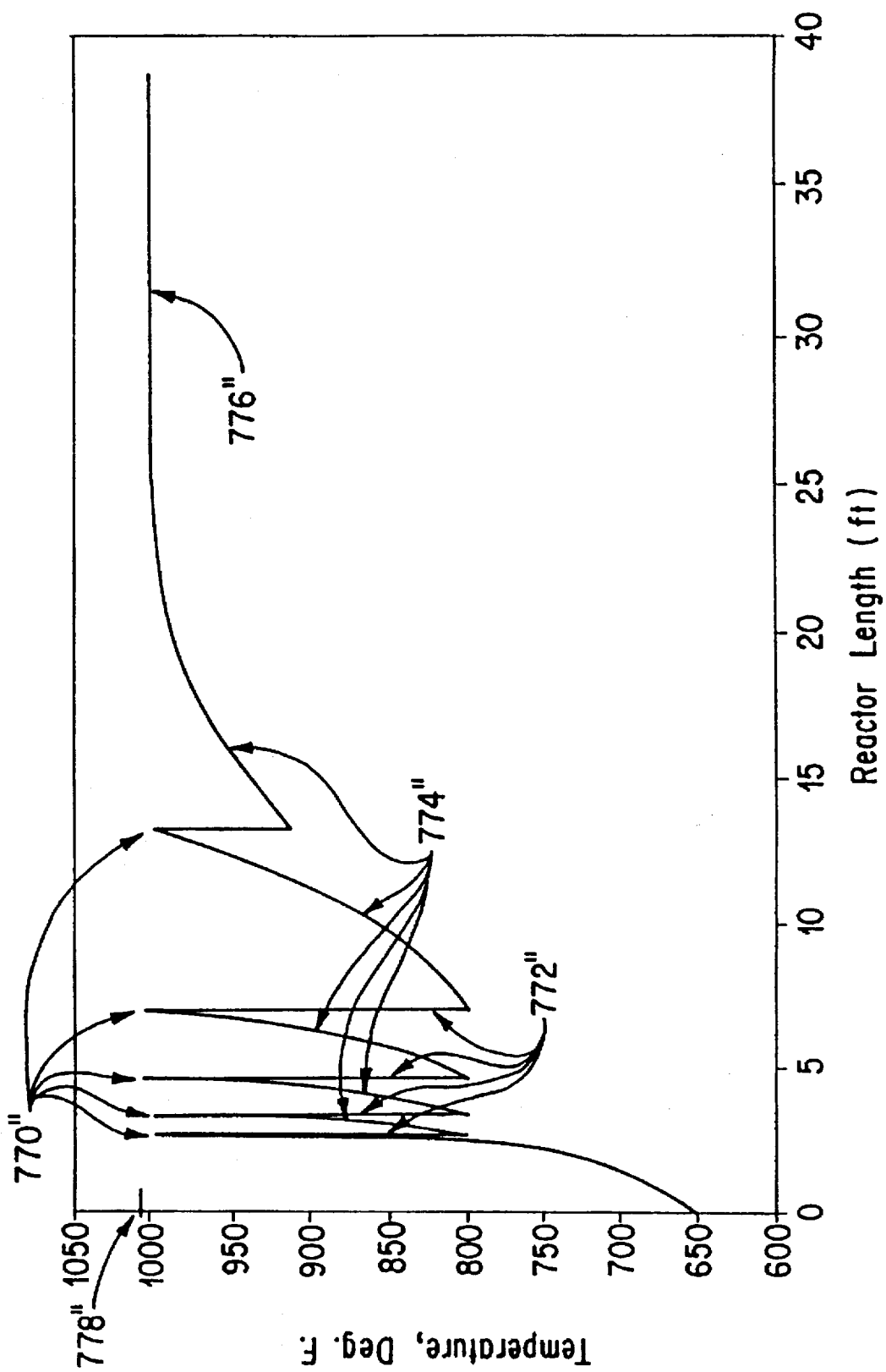
FIG. 13 represents a graph of temperature fluctuations in the reactor used in FIG. 10 versus length of reactor, under the conditions of FIGS. 11 and 12, the graph having been produced by computer simulation, and wherein it has been assumed that the injected water vaporizes instantaneously as soon as it enters the reactor, in order to demonstrate the maximum theoretical temperature variations which may take place according to the present invention.

FIG. 13 illustrates the maximum possible temperature variations versus reactor length. The points 770" correspond also to the discontinuities in FIG. 10, and to positions of side ports, as the respective points 770 of FIG. 11, and 770' of FIG. 12, where oxygen and water are injected. In the computer simulation, it has been assumed that the water vaporizes instantaneously as soon as it enters the reaction chamber. Thus, the temperature decreases rapidly at each injection side port, as illustrated by the steeply descending lines 772" while it sequentially rises gradually to substantially reach a plateau 776" temperature 778". in this particular instance, the plateau temperature is about 1,000° F. Despite the assumption made, the temperature variations are only 200° F. or 20% of the plateau temperature. It may also be seen from FIG. 13 that the swings in temperature are not allowed to substantially exceed the plateau temperature 778", and that the sequential ports are spaced in a manner that oxygen and water are injected as soon as the temperature within the reactor attains again substantially the plateau value, at which point 90–100% of the oxidant has been consumed. Thus, the temperature may be used to determine the appropriate positions of each side injection port with respect to the previous one. In other words, the temperature may be measured at the different available side ports (142 of FIG. 4), and at the position it reaches the value of the plateau temperature, the available port is selected as a side injection port.

Figure 14:
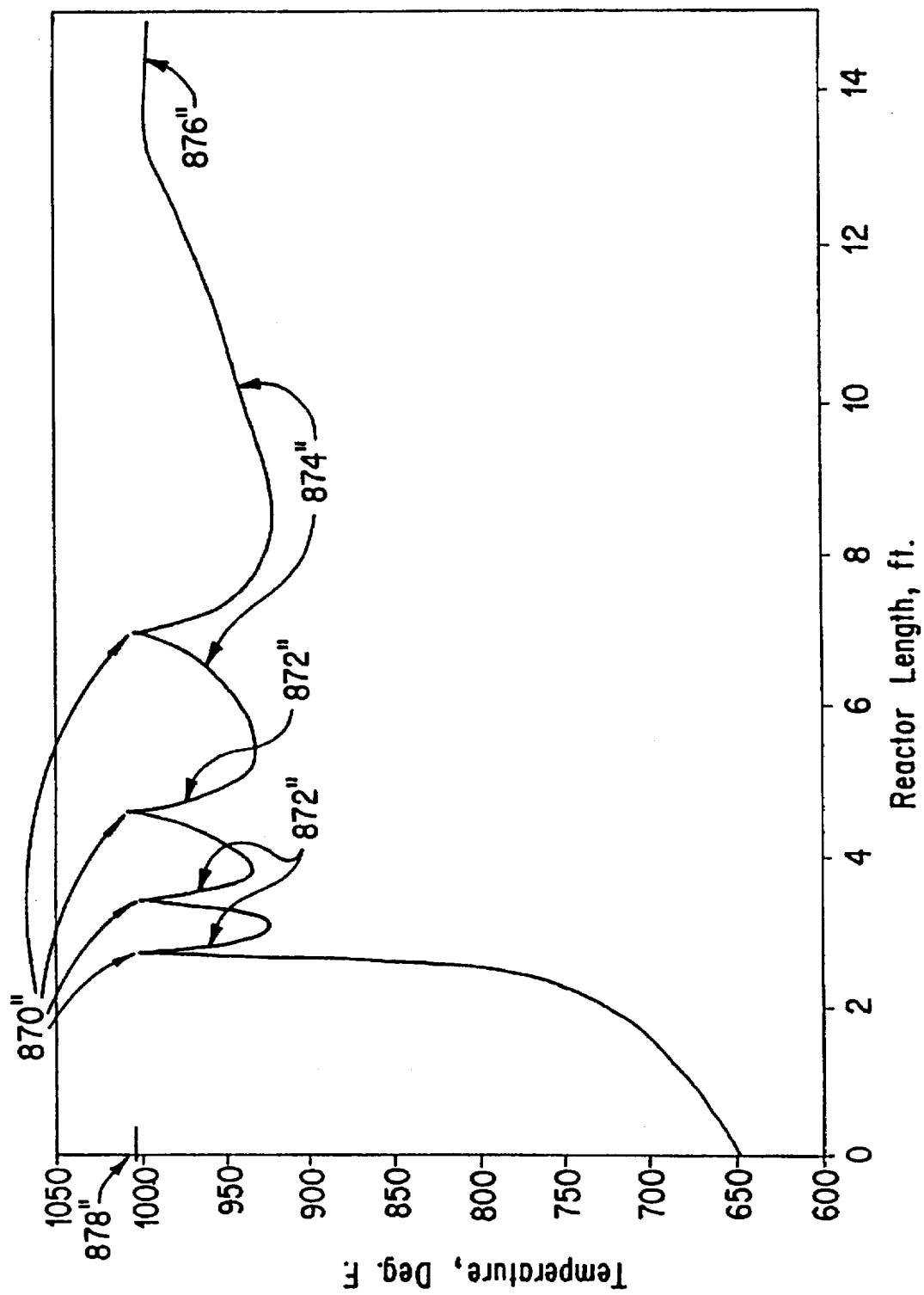
FIG. 14 exemplifies nominal temperature variations taking place according to the present invention.

FIG. 14 exemplifies nominal temperature variations taking place according to the present invention. In most occasions these temperature variations do not exceed 100° F. (10% of the plateau temperature), and in some occasions are even less than 50° F. (5% of the plateau temperature). The temperature peaks 870", corresponding to injection points, have a value of about 1,000° F. in this occasion, substantially the same as the plateau 876" temperature 878". The temperature drop 872", corresponding to injection of water as well as the temperature rise 874" due to the heat of reaction of the oxidant with organic matter are both gradual.

Applicants have also discovered that the distance between the first side injection port and any subsequent side injection port increases approximately logarithmically as the port is positioned further and further away from the first port, according to preferred embodiments of this invention. This may be used to calculate approximately the position of side injection ports from the position of two ports preferably following the first port, or by using other mathematical arrangements well known to the art.

The different aspects of the present invention, exemplified by the various aforegiven embodiments and discussions, may be used as described, but also after any modifications or in any combination resulting thereof. These embodiments have been given as example only and should not be construed as restricting the scope of the present invention as claimed.

In the figures of the drawing, as well as in the description of the present invention, numbers differing by 100 represent similar elements having similar functions.

What is claimed is:

1. A method of treating a primary stream of waste water containing organic matter, the method comprising the steps of:

(a) heating the primary stream to a temperature between 550°–1200° F.;

(b) mixing the heated primary stream with an amount of oxidant lower than required to completely oxidize the organic matter, but adequate to oxidize a sufficient amount of organic matter to raise the temperature of the primary stream to a selected plateau value in the range of 750°–1,200° F., after the primary stream has been introduced into a front port of an elongate reaction chamber and has been allowed to travel toward a back end of said elongate reaction chamber;

(c) injecting an amount of atomized liquid water per unit time and an amount of oxidant per unit time through a first injection side port downstream in the elongate reaction chamber, the first injection side port located at such distance from the front port that 90–100% of the oxidant injected in the front port and any other injection side ports that are upstream of the first injection side port has been reacted with the organic matter, the amount of oxidant injected being effective to reduce the content of organic matter in the stream by a predetermined amount in the primary stream, and the amount of water being such in respect to the amount of oxidant injected, that heat absorbed by the atomized liquid water substantially counterbalances heat of oxidation released by the oxidation of the organic matter in the stream; and (d) repeating step (c) at additional injection side ports downstream of the first injection side port until at a last injection side port, the amount of organic matter has been decreased to less than 1% in the primary stream, at which point an amount of atomized liquid water per unit time and an amount of oxidant per unit time are injected through said last injection side port, the amount of water being such in respect to the amount of oxidant injected through the last side port, that heat absorbed by the atomized liquid water substantially counterbalances heat of oxidation released by the oxidation of the organic matter in the stream, and the amount of oxidant injected through the last side port being such as to allow the presence of free oxidant after the organic matter has been substantially completely oxidized.

2. A method as defined in claim 1, wherein the primary stream has an organic matter content of at least about 10% prior to said step of mixing the heated primary stream with the amount of oxidant, and wherein the temperature to which the primary stream is heated in step (a) is about 550°–705° F.

3. A method as defined in claim 2, wherein the atomized liquid water and the oxidant injected through at least one of the injection side ports are each injected in a direction from the front port to the back end of the reaction chamber.

4. A method as defined in claim 2, wherein the atomized liquid water and the oxidant injected through at least one of the injection side ports are each injected in a direction from the back end to the front port of the reaction chamber.

5. A method as defined in claim 2, wherein the atomized liquid water injected through at least one of the injection side ports is injected in a direction from the back end to the front port of the reaction chamber and the oxidant injected through at least one of the injection side ports is injected in a direction from the front port to the back end of the reaction chamber.

6. A method as defined in claim 2, further comprising a step of determining Total Oxygen Demand of a waste water stream selected from the group consisting of a secondary waste water stream and the primary waste water stream; and a step of mixing the secondary stream with a tertiary waste water stream of known Total Oxygen Demand so as to yield the primary waste water stream of a selected value of Total Oxygen Demand.

7. A method as defined in claim 2, further comprising a step of determining Total Oxygen Demand for the primary stream, and a step of controlling the total amount of oxidant injected through all the ports of the reaction chamber so as to be higher than stoichiometrically required by said Total Oxygen Demand.

8. A method as defined in claim 2, further comprising a step of condensing water downstream of the back end of the reaction chamber and redirecting the condensed water to at least one of said injection side ports.

9. A method as defined in claim 2, further comprising a step of detecting oxidant content in effluent gas exiting the back end of the reaction chamber and determining if said oxidant content falls outside a selected range of values; and a step of altering the amount of injected oxidant through the last injection side port to cause said oxidant content in the effluent gas to assume a value falling within the selected range of values.

10. A method as defined in claim 2, further comprising a step of detecting Total Organic Carbon content in effluent liquid exiting the back end of the reaction chamber and determining if said Total Organic Carbon content exceeds a selected value;

a step selected from the group consisting of:
operating a diverter valve to send said effluent liquid to a segregated collection tank,
raising the plateau value,
reducing a rate of introduction of the primary stream into the reaction chamber,
lowering the organic matter content in the primary stream,
increasing the respective amounts of oxidant and atomized water injected into the reaction chamber per unit time through at least one of said injection side ports, and
a combination thereof,
until the Total Organic Carbon content falls below the selected value.

11. A method as defined in claim 2, further comprising a step of detecting carbon monoxide content in effluent gas exiting the back end of the reaction chamber and determining if said carbon monoxide content exceeds a selected value;

a step selected from the group consisting of:
operating a diverter valve to send said effluent gas to a flare for oxidizing further said carbon monoxide to carbon dioxide,
raising the plateau value,
reducing a rate of introduction of the primary stream into the reaction chamber,
lowering the organic matter content in the primary stream,
increasing the respective amounts of oxidant and atomized water injected into the reaction chamber per unit time through at least one of said injection side ports, and
a combination thereof,
until the carbon monoxide content falls below the selected value.

12. A method as defined in claim 2, farther comprising a step of adding a solution containing a compound selected from the group consisting of nitrite compound, nitrate compound, and mixtures thereof, through an addition port located between the last injection side port and the back end of the reaction chamber.

13. A method as defined in claim 2, further comprising a step of determining Total Oxygen Demand for the primary stream, and a step of controlling the total amount of oxidant injected through all the ports of the reaction chamber so as to be higher than stoichiometrically required by said Total Oxygen Demand.

14. A method as defined in claim 2, further comprising a step of detecting carbon monoxide content in effluent gas exiting the back end of the reaction chamber and determining if said carbon monoxide content exceeds a selected value;

a step selected from the group consisting of:
operating a diverter valve to send said effluent gas to a flare for oxidizing further said carbon monoxide to carbon dioxide,
raising the plateau value,
reducing a rate of introduction of the primary stream into the reaction chamber,
lowering the organic matter content in the primary stream,
increasing the respective amounts of oxidant and atomized water injected into the reaction chamber per unit time through at least one of said injection side ports, and
a combination thereof,
until the carbon monoxide content falls below the selected value.

15. A method as defined in claim 1, wherein the atomized liquid water and the oxidant injected through at least one of the injection side ports are each injected in a direction from the front port to the back end of the reaction chamber.

16. A method as defined in claim 1, wherein the atomized liquid water and the oxidant injected through at least one of the injection side ports are each injected in a direction from the back end to the front port of the reaction chamber.

17. A method as defined in claim 1, wherein the atomized liquid water injected through at least one of the injection side ports is injected in a direction from the back end to the front port of the reaction chamber and the oxidant injected through at least one of the injection side ports is injected in a direction from the front port to the back end of the reaction chamber.

18. A method as defined in claim 1, further comprising a step of determining Total Oxygen Demand of a secondary waste water stream; and a step of mixing the secondary stream with a tertiary waste water stream of known Total Oxygen Demand so as to yield the primary waste water stream of a selected value of Total Oxygen Demand.

19. A method as defined in claim 1, further comprising a step of condensing water downstream of the back end of the reaction chamber and re-directing the condensed water to at least one of said injection side ports.

20. A method as defined in claim 1, further comprising a step of detecting oxidant content in effluent gas exiting the back end of the reaction chamber and determining if said oxidant content falls outside a selected range of values; and a step of altering the amount of injected oxidant through the last injection side port to cause said oxidant content in the effluent gas to assume a value falling within the selected range of values.

21. A method as defined in claim 1, further comprising a step of detecting Total Organic Carbon content in effluent liquid exiting the back end of the reaction chamber and determining if said Total Organic Carbon content exceeds a selected value;

a step selected from the group consisting of: operating a diverter valve to send said effluent liquid to a segregated collection tank, raising the plateau value, reducing a rate of introduction of the primary stream into the reaction chamber, lowering the organic matter content in the primary stream, increasing the respective amounts of oxidant and atomized water injected into the reaction chamber per unit time through at least one of said injection side ports, and a combination thereof, until the Total Organic Carbon content falls below the selected value.

22. A method as defined in claim 1, further comprising a step of adding a solution of a compound selected from a group consisting of nitrite compound, nitrate compound, and a mixture thereof, through an addition port located between the last injection side port and the back end of the reaction chamber.

23. A method of treating a stream containing organic matter, the method comprising:

(a) pressurizing the stream to at least about 3200 psia;

(b) heating the stream to a selected first temperature between about 600° F. and about 1200° F.;

(c) introducing the stream into a front portion of a reaction chamber and directing the stream toward a back portion of the reaction chamber;

(d) injecting an amount of oxidant through a front port of the reaction chamber into the stream, wherein the amount of oxidant is insufficient to completely oxidize the organic matter but adequate to oxidize a sufficient amount of organic matter to alter the stream temperature to a selected second temperature in the range of about 700° F. to about 1,200° F., and wherein the second temperature is greater than the first temperature;

(e) injecting an amount of cooling water and an amount of oxidant through an injection side port of the reaction chamber as the stream travels through the reaction chamber, and wherein the amount of oxidant injected through the side port is controlled to reduce the content of organic matter in the stream by a selected amount, and the amount of cooling water injected through the side port is controlled in proportion to the amount of oxidant injected through the side port such that heat absorbed by the cooling water substantially (i) counterbalances at least part of the heat of oxidation released by the reaction of the oxidant injected through the side port with the organic matter, and (ii) selectively controls the temperature of the stream in the range of about 750° F. to about 1200° F.

24. The method of claim 23 wherein the second temperature is greater than about 750° F.

25. The method of claim 23 wherein the injection side port is located downstream from the front port such that at least about 90% of the oxidant injected through the front port has been reacted with the organic matter before the oxidant reaches the injection side port.

26. The method of claim 23 wherein the injection side port is located downstream from the front port such that at least about 90% of the oxidant injected through the front port has been reacted with the organic matter before the oxidant reaches the injection side port, and wherein the amount of water injected relative to the amount of oxidant injected through the side port causes the cooling water to absorb substantially any heat generated during oxidation.

27. The method of claim 23 wherein the injection side port is located downstream from the front port such that at least about 90% of the oxidant injected through the front port has been reacted with the organic matter before the oxidant reaches the injection side port, and further comprising injecting amounts of cooling water and amounts of oxidant through at least one additional injection side port along the reaction chamber as the stream travels through the reaction chamber, and wherein the at least one additional side port is located along the reaction chamber such that at least about 90% of a total amount of oxidant injected into the stream upstream of each respective additional side port has reacted with organic matter in the stream before the oxidant reaches the respective at least one additional side port.

28. The method of claim 27, further comprising an addition port located between the at least one additional injection side port and the back portion of the reaction chamber, and further comprising adding a solution containing a nitrite compound, a nitrate compound, or a mixture thereof, through the addition port and into the reaction chamber.

29. The method of claim 23 wherein the injection side port is located downstream from the front port such that at least about 90% of the oxidant injected through the front port has been reacted with the organic matter before the oxidant reaches the side port, and wherein the amount of water injected relative to the amount of oxidant injected through the side port causes the stream to settle to a selected temperature.

30. The method of claim 23 wherein the injection side port is located downstream from the front port such that at least about 90% of the oxidant injected through the front port has been reacted with the organic matter before the oxidant reaches the side port, and wherein the amount of water injected relative to the amount of oxidant injected through the side port causes the stream to settle to a temperature substantially equal to the temperature of the steam just prior to the injection of water or oxidant through the injection side port.

31. The method of claim 23 wherein both the cooling water and the oxidant injected through the side port injected into the reaction chamber in a direction from the front portion to the back portion.

32. The method of claim 23 wherein both the cooling water and the oxidant are injected through the side port into the reaction chamber in a direction from the back portion to the front portion.

33. The method of claim 23 wherein the cooling water is injected into the reaction chamber in a direction from the back portion to the front portion, and the oxidant injected through the side port is injected into the reaction chamber in a direction from the front portion to the back portion.

34. The method of claim 23, further comprising determining Total Oxygen Demand of the stream and mixing a second stream of known Total Oxygen Demand with the stream to yield a third stream having a selected Total Oxygen Demand.

35. The method of claim 23, further comprising determining Total Oxygen Demand for the stream and controlling a total amount of oxidant injected through the injection side port of the reaction chamber such that the total amount of oxidant is greater than that required by the Total Oxygen Demand.

36. The method of claim 23, further comprising condensing water at a location downstream of the reaction chamber and redirecting the condensed water to the injection side port.

37. The method of claim 23, further comprising determining oxidant content in an effluent stream exiting the reaction chamber, and altering the amount of oxidant injected through the injection side port as a function of the oxidant content.

38. The method of claim 23, further comprising:
determining Total Organic Carbon content in an effluent stream exiting the reaction chamber, and determining whether the Total Organic Carbon content of the effluent liquid exceeds a specified value; and
performing at least one of the following steps until the Total Organic Carbon content falls below the specified value:
operating a diverter valve to send the effluent stream to a collection tank,
raising the first temperature of the stream,
lowering a rate of introduction of the stream into the reaction chamber,
lowering the organic matter content in the stream,
increasing the amount of oxidant and the amount of cooling water entering the reaction chamber through the injection side port, and
a combination thereof.

39. The method of claim 23, further comprising:
determining carbon monoxide content in an effluent gas exiting the back portion of the reaction chamber, and determining whether the carbon monoxide content of effluent gas exceeds a specified value; and
performing at least one of the following steps until the carbon monoxide content falls below the specified value:
operating a diverter valve to send the effluent gas to a flare to oxidize at least a portion of the carbon monoxide to carbon dioxide,
raising the first temperature of the stream,
lowering the rate of introduction of the stream into the reaction chamber,
lowering the organic matter content in the stream,
increasing the amount of oxidant and the amount of cooling water entering the reaction chamber through the injection side port, and
a combination thereof.

40. The method of claim 23, further comprising adding a solution containing a nitrite compound, nitrate compound, or a mixture thereof, through the injection side port and into the reaction chamber.

41. The method of claim 23 wherein the cooling water is injected through the side port into the reaction chamber in a direction from the front portion to the back portion, and the oxidant is injected through the side port into the reaction chamber in a direction from the front portion to the back portion.

42. The method of claim 23, further comprising atomizing at least a portion of the cooling water injected through the side port.

43. The method of claim 23, further comprising adjusting reactor conditions as a function of a carbon monoxide content of an effluent from the reaction chamber.

44. The method of claim 23 wherein the stream contains at least about 3% organic matter by weight.

45. The method of claim 23, further comprising varying the amount of oxidant added through the injection side port as a function of the organic content of the stream.

46. The method of claim 23, further comprising varying the amount of water added through the injection side port as a function of the organic content of the stream.

47. The method of claim 23, further comprising varying the amount of water added through the injection side port as a function of the amount of oxidant added through the injection side port.

48. The method of claim 23, further comprising detecting the carbon monoxide content of an effluent stream from the reaction chamber.

49. The method of claim 23, further comprising atomizing a selected amount of water added to the reaction chamber to cause the stream to reach a selected temperature.

50. The method of claim 23, further comprising detecting the carbon monoxide content of an effluent from the reaction chamber and altering a flowrate of the steam entering the reaction chamber as a function of the carbon monoxide content of the effluent.

51. The method of claim 23, further comprising adding a free radical generator to the reaction chamber.

52. The method of claim 23, further comprising adding hydrogen peroxide to the reaction chamber.

53. The method of claim 23 wherein a reaction product is formed in the reaction chamber, the reaction product being more difficult to react in the reactor than the oxidant and organic matter, and further comprising adding a selected amount of a free radical generator to enhance a reaction of the reactant product in the reaction chamber.

54. The method of claim 23, further comprising mixing the stream with oxidant in a mixing system prior to the introduction of the stream into the reaction chamber and subsequent to the heating of the stream to the selected first temperature.

55. The method of claim 23, further comprising mixing the stream with an amount of oxidant sufficient to raise the temperature of the stream to the selected second temperature, the mixing occurring in a mixing system prior to the introduction of the stream into the reaction chamber and subsequent to the heating of the stream to the selected first temperature.

56. The method of claim 23, further comprising selecting the selected first temperature to which the stream is heated in step (a) as a function of the organic matter content of the stream, and wherein the selected first temperature is between about 600° F. and about 705° F. and the stream has a content of organic matter greater than about 10%.

57. The method of claim 23 wherein a reaction product is formed in the reaction chamber, the reaction product being more difficult to react in the reactor than the oxidant and organic matter, and further comprising adding a selected amount of a free radical generator to enhance a reaction of the reactant product in the reaction chamber, and wherein the reaction product is acetic acid, the oxidant is oxygen, and the free radical generator is hydrogen peroxide.

58. The method of claim 23 wherein the amount of oxidant injected into the stream through the injection side port is sufficient to reduce the content of organic matter in the stream by about 3–5 weight percent.

59. The method of claim 23 wherein the amount of oxidant added through the injection side port is varied as a function of the content of organic matter in the stream.

60. The method of claim 23, wherein the cooling water and oxidant are introduced into the reaction chamber simultaneously through the injection port.

61. The method of claim 23 wherein the amount of oxidant added to the reaction chamber is varied as a function of the temperature of the stream.

62. The method of claim 23 wherein the amount of cooling water injected into the stream is varied as a function of the temperature of the stream.

63. The method of claim 23 wherein the oxidant is injected into the reaction chamber prior to the injection of cooling water into the chamber.

64. The method of claim 23 wherein the reaction chamber comprises a primary reaction zone and a secondary reaction zone, the primary reaction zone occurring where the content of organic matter in the stream is greater than about 1% and the secondary reaction zone being located downstream of the primary reaction zone, and further comprising introducing a free radical generator into the secondary reaction zone to enhance the reaction of organic matter in the secondary reaction zone.

65. The method of claim 23 wherein the injection side port is located downstream from the front port such that at least about 90% of the oxidant injected through the front port has been reacted with the organic matter before the oxidant reaches the injection side port, and further comprising injecting amounts of cooling water and amounts of oxidant through a plurality of additional injection side ports along the reaction chamber as the stream travels through the reaction chamber, and wherein the additional side ports are each located along the reaction chamber such that at least about 90% of a total amount of oxidant injected into the stream upstream has reacted with organic matter in the stream before the upstream oxidant reaches each side port, the amount of oxidant injected through the additional side ports reduces a content of organic matter in the stream by a selected amount in the stream, and the amount of cooling water injected relative to the amount of oxidant injected into each side port causes the cooling water to absorb heat generated during oxidation; and the total weight percentage of organic matter in the stream is decreased to less than 1% at a final injection side port, at which point an amount of cooling water and an amount of oxidant are injected through the final port, wherein the amount of cooling water injected relative to oxidant injected into each side port causes the stream to settle to a selected temperature, and the amount of oxidant injected into the final port is such that an amount of free oxidant remains after the organic matter has been substantially completely oxidized.

66. The method of claim 23, further comprising determining carbon monoxide content of an effluent gas exiting the reaction chamber.

* * * * *

UNITED STATES PATENT AND TRADEMARK OFFICE
CERTIFICATE OF CORRECTION

PATENT NO.: 5,720,889

DATED: February 24, 1998

INVENTOR(S): McBrayer, et al

It is certified that error appears in the above-identified patent and that said Letters Patent is hereby corrected as shown below:

In the Claims:

Claim 12, col. 25, line 55, please delete "farther" and substitute therefor -- further --.

Claim 31, col. 28, line 40, after "port" insert -- are --.

Signed and Sealed this

Fifth Day of May, 1998

Attest:

BRUCE LEHMAN

Attesting Officer     Commissioner of Patents and Trademarks